United States Patent
Jarjoura et al.

(10) Patent No.: US 11,608,123 B2
(45) Date of Patent: Mar. 21, 2023

(54) VEHICLE TAILGATE WITH FOLD OUT STEP

(71) Applicant: VENTRA GROUP, CO., Halifax (CA)

(72) Inventors: Steve Jarjoura, Barrie (CA); Joaquin Hung, Markham (CA); Wayne Doswell, Ontario (CA); Guido Benvenuto, Ontario (CA)

(73) Assignee: VENTRA GROUP, CO., Halifax (CA)

( * ) Notice: Subject to any disclaimer, the term of this patent is extended or adjusted under 35 U.S.C. 154(b) by 132 days.

(21) Appl. No.: 17/315,442

(22) Filed: May 10, 2021

(65) Prior Publication Data

US 2021/0380175 A1    Dec. 9, 2021

Related U.S. Application Data

(60) Provisional application No. 63/036,252, filed on Jun. 8, 2020.

(51) Int. Cl.
| | | |
|---|---|---|
| *B62D 33/037* | (2006.01) | |
| *B60R 3/02* | (2006.01) | |
| *B62D 33/027* | (2006.01) | |

(52) U.S. Cl.
CPC .............. *B62D 33/037* (2013.01); *B60R 3/02* (2013.01); *B62D 33/0273* (2013.01)

(58) Field of Classification Search
CPC ...... B62D 33/037; B62D 33/0273; B60R 3/02
See application file for complete search history.

(56) References Cited

U.S. PATENT DOCUMENTS

| | | |
|---|---|---|
| 688,448 A | 12/1901 | Thompson |
| 4,846,487 A | 7/1989 | Criley |
| 8,201,869 B1 * | 6/2012 | Butlin, Jr. ................ B60R 3/02 296/57.1 |
| 8,348,325 B2 | 1/2013 | Hausler et al. |
| 8,740,279 B1 | 6/2014 | Mcgoff et al. |
| 8,919,853 B2 | 12/2014 | Krishnan et al. |
| 9,315,221 B1 | 4/2016 | Anderson |
| 9,463,746 B2 | 10/2016 | Butlin, Jr. et al. |

(Continued)

FOREIGN PATENT DOCUMENTS

FR          3078521 A1      9/2019

*Primary Examiner* — Dennis H Pedder
*Assistant Examiner* — Melissa Ann Bonifazi
(74) *Attorney, Agent, or Firm* — Pillsbury Winthrop Shaw Pittman, LLP

(57) ABSTRACT

A tailgate system for a vehicle comprises a tailgate and a support system. The tailgate includes a movable tailgate portion movably connected to the tailgate and configured to cover an access opening in the tailgate. The support system is selectively operable between a connected state connected to both the tailgate and the movable tailgate portion and a disconnected state. The support system in the connected state is configured to support the movable tailgate portion in a step position pivoted downwardly from the tailgate in an open position thereof to provide a step. The support system in the disconnected state is configured to allow the movable tailgate portion to pivot downwardly from the tailgate in a closed position to the downwardly extending open position. The angle of pivotal movement of the movable tailgate portion relative to the tailgate is greater in the downwardly extending open position than in the step position.

23 Claims, 18 Drawing Sheets

Center Section With Step Unfolded

(56) References Cited

U.S. PATENT DOCUMENTS

| | | | |
|---|---|---|---|
| 9,522,621 | B2 | 12/2016 | Krajenke et al. |
| 9,889,782 | B2 * | 2/2018 | Gobart .................... B60N 3/02 |
| 9,950,750 | B2 | 4/2018 | Baddage et al. |
| 9,988,103 | B1 | 6/2018 | Mouch et al. |
| 10,005,396 | B2 | 6/2018 | Spahn et al. |
| 10,106,087 | B2 | 10/2018 | Stojkovic et al. |
| 10,246,137 | B2 | 4/2019 | Ngo |
| 10,308,291 | B2 | 6/2019 | Seki et al. |
| 10,450,008 | B2 | 10/2019 | Jacob et al. |
| 10,464,618 | B2 | 11/2019 | Lowe et al. |
| 11,066,111 | B2 * | 7/2021 | Stojkovic ........... B62D 33/0273 |
| 11,220,301 | B2 * | 1/2022 | Robinson ............. B62D 33/037 |
| 11,328,451 | B2 * | 5/2022 | Itoh ....................... G06T 3/4053 |
| 2014/0136021 | A1 | 5/2014 | Bambenek et al. |
| 2014/0306425 | A1 | 10/2014 | Akinson |
| 2016/0046177 | A1 | 2/2016 | Yamaguchi et al. |
| 2016/0075286 | A1 | 3/2016 | Butlin, Jr. et al. |
| 2019/0054961 | A1 * | 2/2019 | Ngo ........................ B60R 3/02 |
| 2021/0221448 | A1 * | 7/2021 | Hung ................. B62D 33/0273 |
| 2022/0097608 | A1 * | 3/2022 | Patterson ........... B62D 33/0273 |
| 2022/0161870 | A1 * | 5/2022 | Horner .................... B60R 3/02 |
| 2022/0314889 | A1 * | 10/2022 | Glickman ............... G01L 1/225 |

* cited by examiner

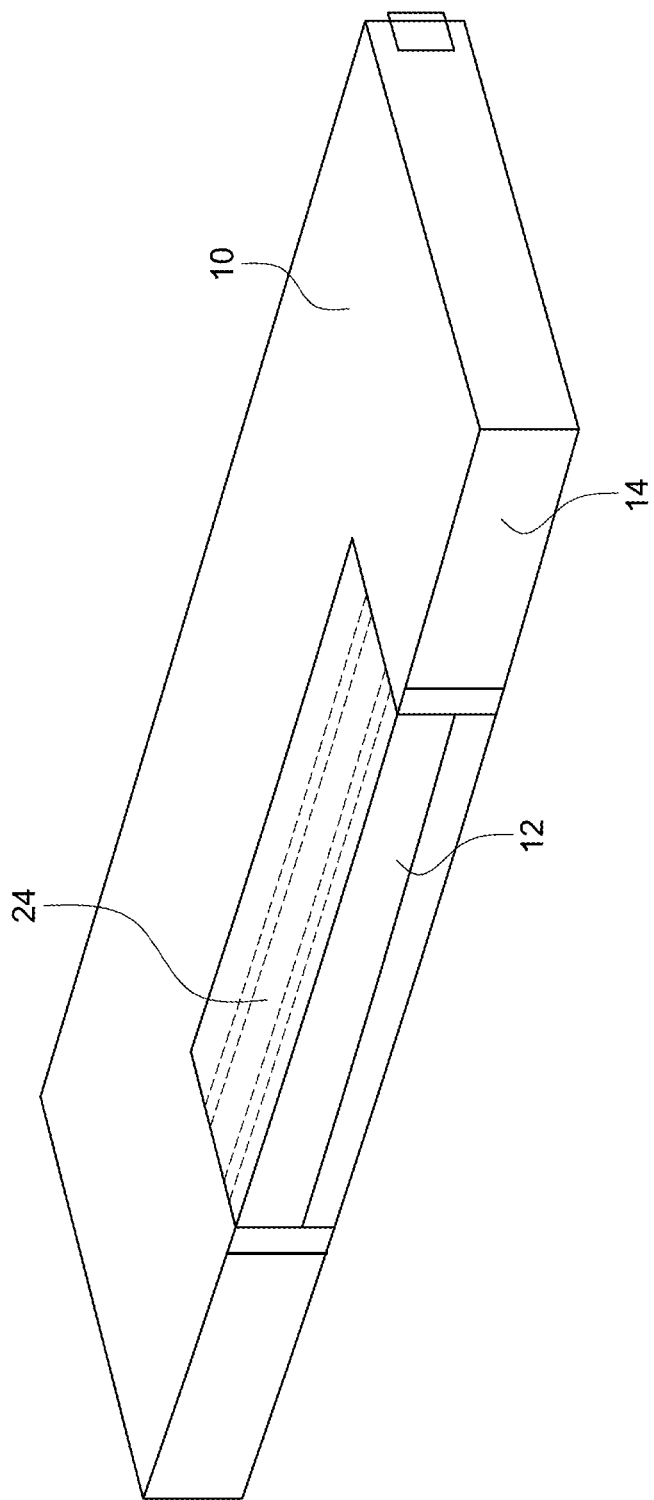

Center Section Deployed To Open Position Prior To Unfolding Step

VEHICLE TAILGATE WITH FOLD OUT STEP

CROSS-REFERENCE TO RELATED APPLICATIONS

The subject application claims priority to U.S. Patent Application No. 63/036,252, filed Jun. 8, 2020, the subject matter of which is incorporated herein by reference in entirety.

BACKGROUND

Field

The present patent application relates to a vehicle tailgate system with a fold out step.

Description of Related Art

There are several accessibility features currently in the market on various vehicles/pickup trucks to improve access to the truck bed for loading and unloading the cargo. Examples include U.S. Pat. Nos. 688,448; 4,846,487; 8,201,869; 8,348,325; and 9,463,746, the entirety of which are incorporated herein by reference.

The present patent application provides an improved vehicle tailgate system.

BRIEF SUMMARY

In one embodiment of the present patent application, a tailgate system for a vehicle is provided. The tailgate system comprises a tailgate and a support system. The tailgate is pivotally mounted to a vehicle body for movement about a generally horizontal pivot axis between an open position in which the tailgate extends generally horizontally along a vehicle bed to allow access to a vehicle bed area and a closed position in which the tailgate extends generally vertically to close access to the vehicle bed area. The tailgate includes a movable tailgate portion movably connected to the tailgate and configured to cover an access opening in the tailgate. The access opening in the tailgate is configured to provide access to the vehicle bed area when the tailgate is in the closed position and the movable tailgate portion is pivoted to a downwardly extending open position. The support system is selectively operable between a connected state connected to both the tailgate and the movable tailgate portion and a disconnected state. The support system in the connected state is configured to support the movable tailgate portion in a step position pivoted downwardly from the tailgate in the open position thereof to provide a step. The support system in the disconnected state is configured to allow the movable tailgate portion to pivot downwardly from the tailgate in the closed position thereof to the downwardly extending open position. The angle of pivotal movement of the movable tailgate portion relative to the tailgate is greater in the downwardly extending open position than in the step position.

In another embodiment of the present patent application, a tailgate system for a vehicle is provided. The tailgate system includes a tailgate. The tailgate is pivotally mounted to a vehicle body for movement about a generally horizontal pivot axis between an open position in which the tailgate extends generally horizontally along a vehicle bed to allow access to a vehicle bed area and a closed position in which the tailgate extends generally vertically to close access to the vehicle bed area. The tailgate includes an access opening configured to provide access to the vehicle bed area when the tailgate is in the closed position. The tailgate includes a movable tailgate portion movably connected to the tailgate. When the tailgate is in the closed position, the movable tailgate portion is configured to cover the access opening in the tailgate. When the tailgate is in the open position, the movable tailgate portion is configured to be moved to a step position to provide a step. The tailgate includes a movable panel configured to provide a supplemental step between the aforementioned step and the truck bed when the movable tailgate portion is in the step position.

These and other aspects of the present patent application, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which

FIGS. 7A and 7B show perspective views of the vehicle tailgate system of FIG. 2, wherein the tailgate is in its lowered, open position and the movable tailgate portion is in its horizontal, closed position;

In the illustrated embodiments of the present patent application as shown in FIGS. 5-11 and 13-15, some portions/components of the vehicle tailgate system are not for sake of clarity and to better illustrate other portions/components of the vehicle tailgate system.

DETAILED DESCRIPTION OF THE DRAWINGS

Referring to FIGS. 1-10 and 12, the present patent application provides a tailgate system 10 for a vehicle 18. The tailgate system may be referred to as vehicle tailgate system.

Figure 1:
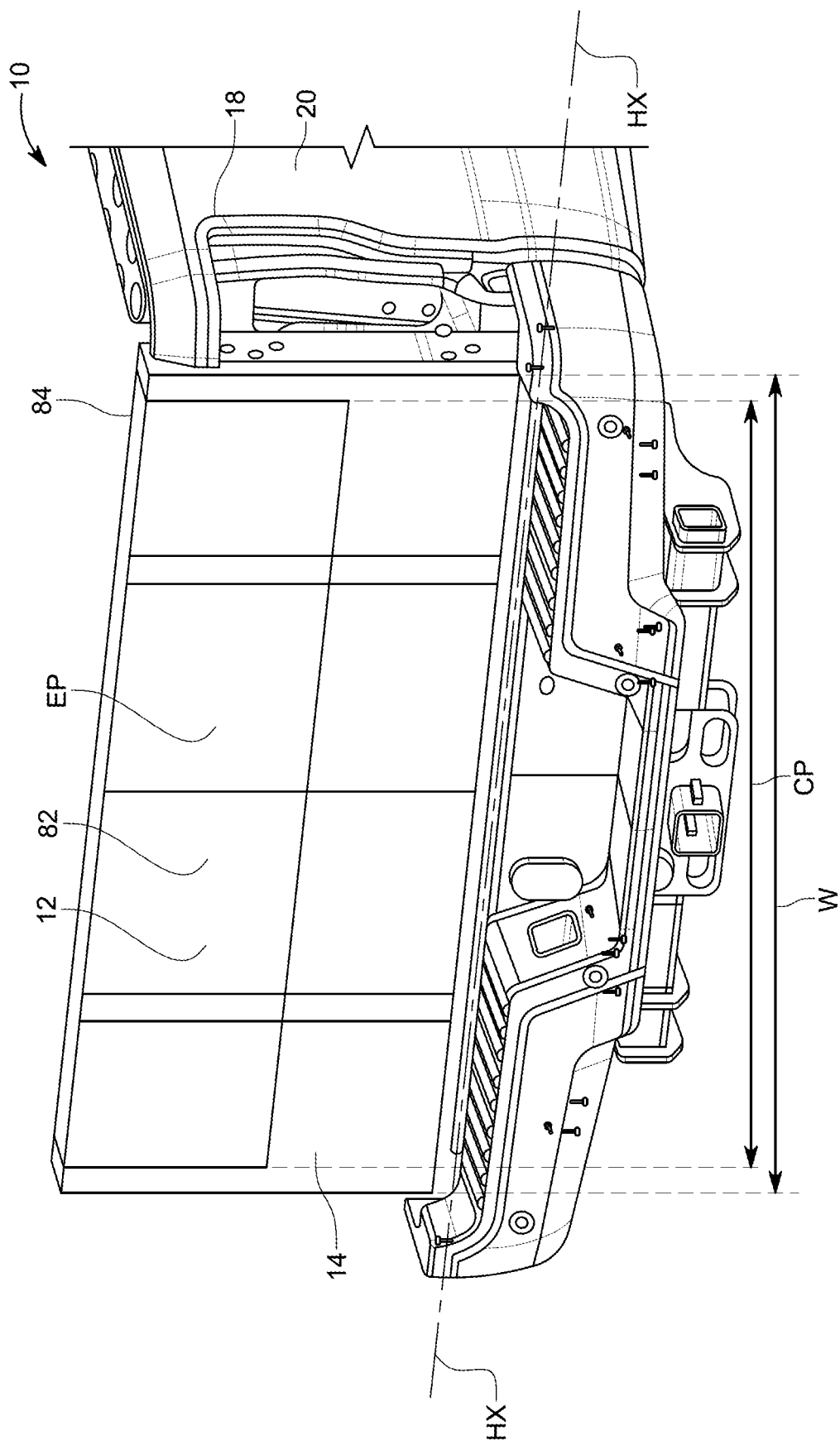
FIG. 1 shows a perspective view of a vehicle tailgate system in accordance with an embodiment of the present patent application, wherein a tailgate is in its raised, closed position, a movable tailgate portion is in its vertical, closed position, and the movable tailgate portion extends substantially across the width of the tailgate.
Figure 2:
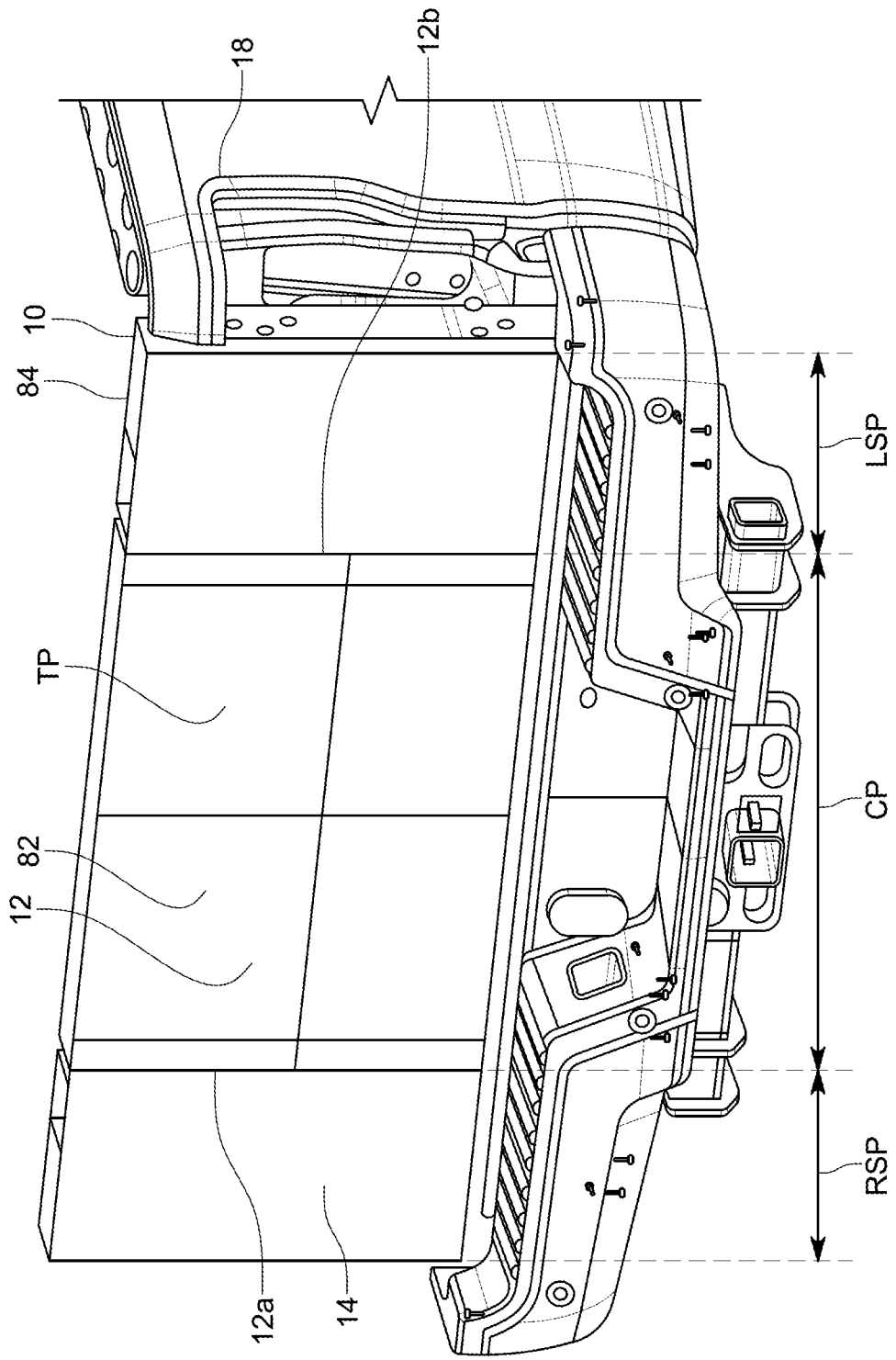
FIG. 2 shows a perspective view of a vehicle tailgate system in accordance with another embodiment of the present patent application, wherein a tailgate is in its raised, closed position, a movable tailgate portion is in its vertical, closed position, and the movable tailgate portion is generally disposed in a central portion of the tailgate.
Figure 3:
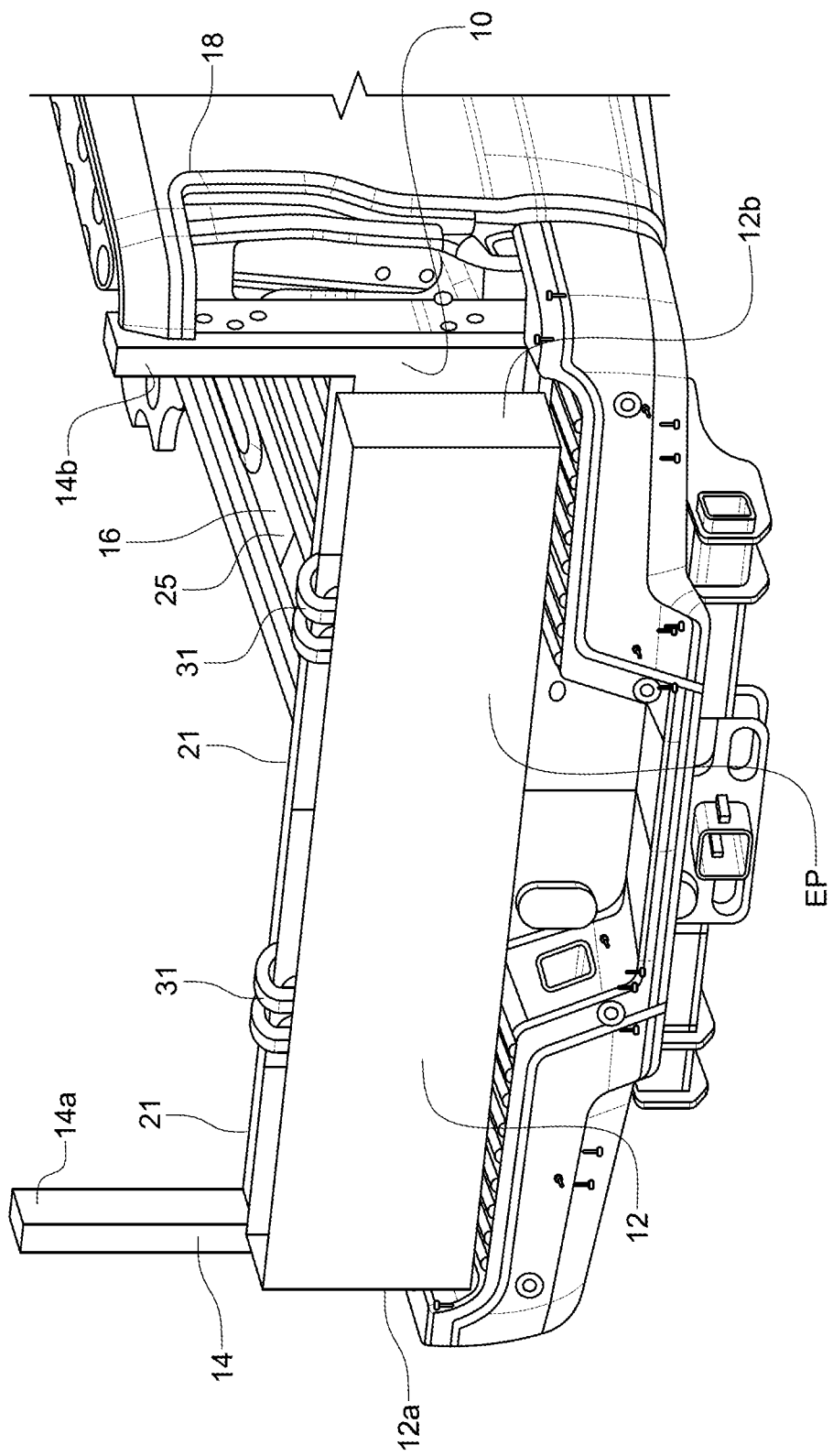
FIG. 3 shows a perspective view of the vehicle tailgate system of FIG. 1, wherein the tailgate is in its raised, closed position and the movable tailgate portion is in its vertical, open/access position.
Figure 4:
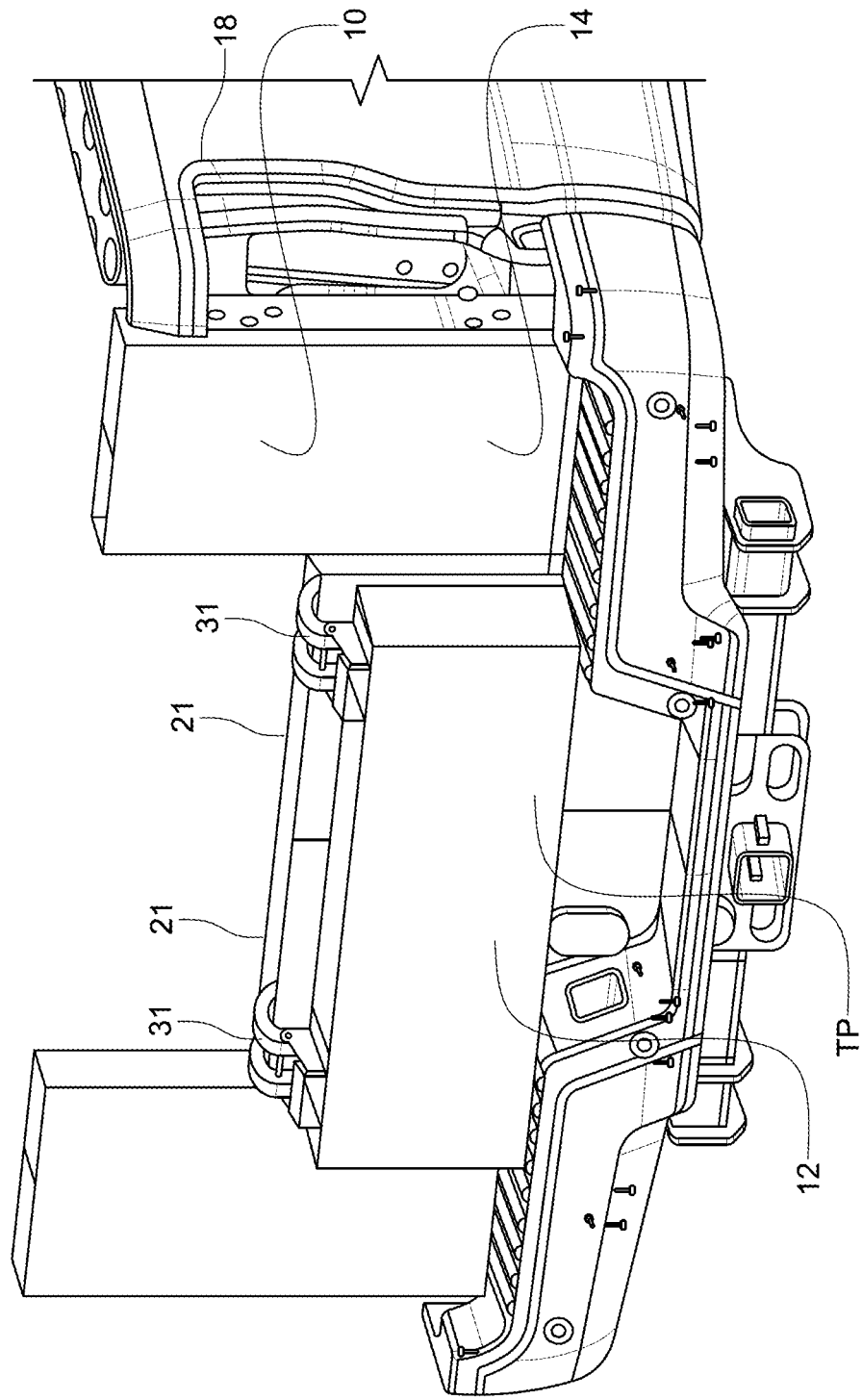
FIG. 4 shows a perspective view of the vehicle tailgate system of FIG. 2, wherein the tailgate is in its raised, closed position and the movable tailgate portion is in its vertical, open/access position.
Figure 5:
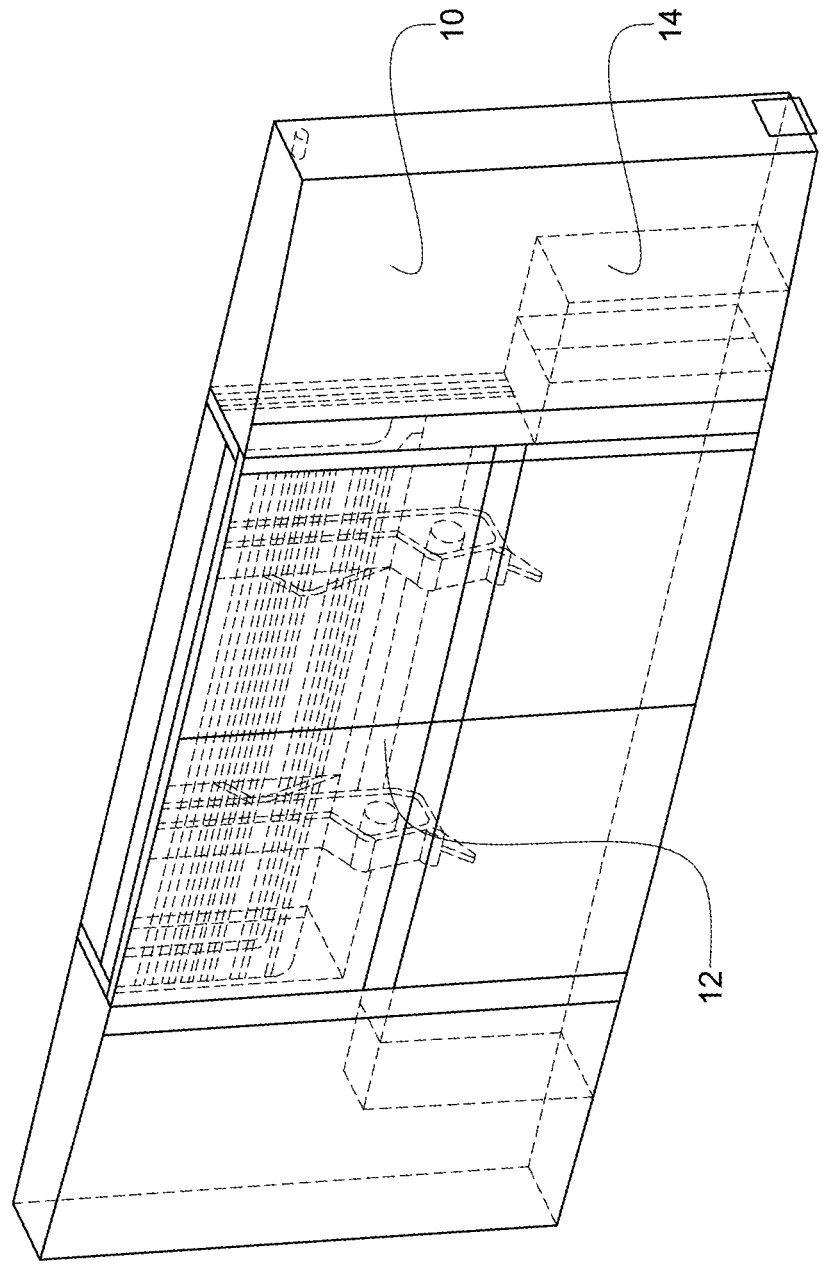
FIG. 5 shows another perspective view of the vehicle tailgate system of FIG. 2, wherein the tailgate is in its raised, closed position and the movable tailgate portion is in its vertical, closed position.
Figure 6:
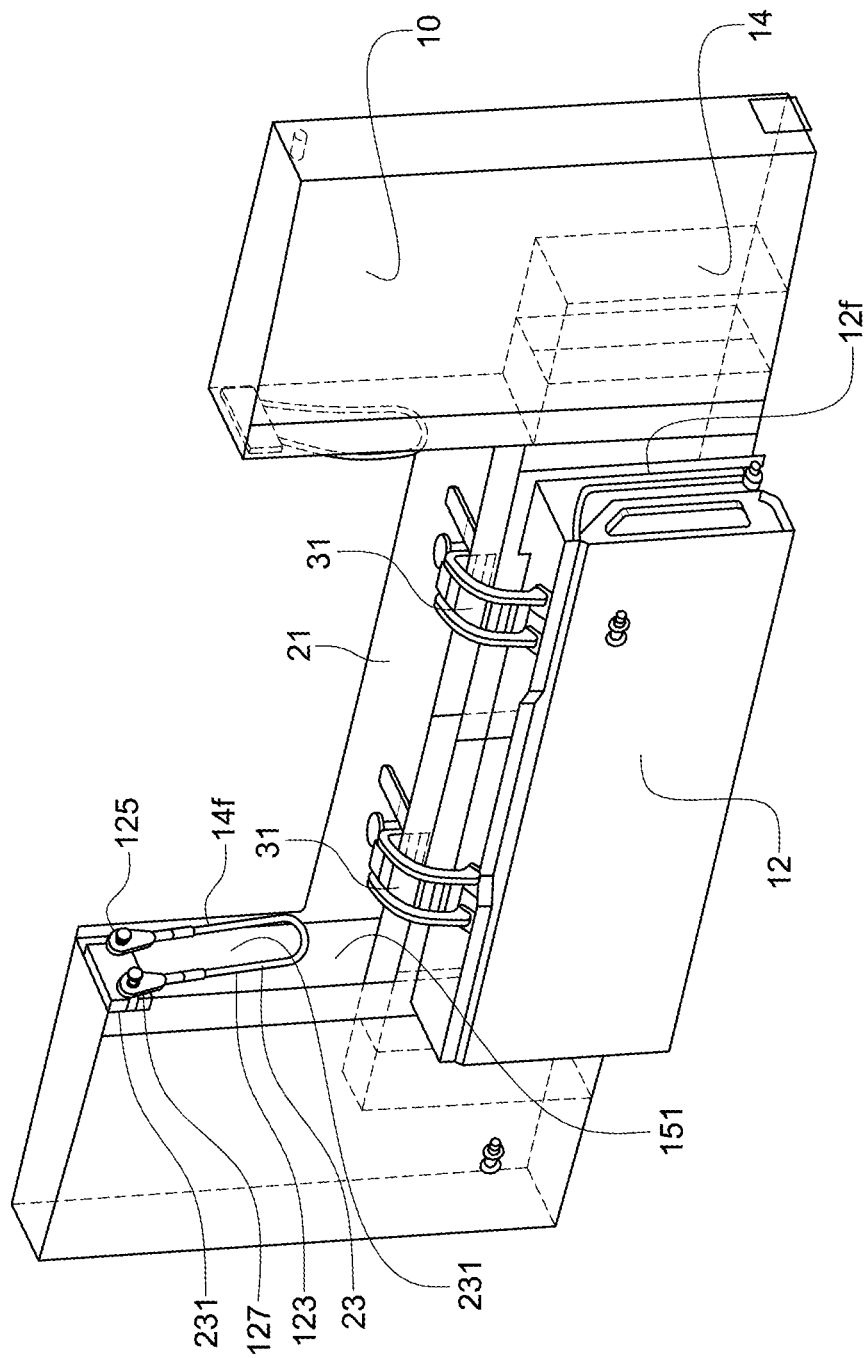
FIG. 6 shows another perspective view of the vehicle tailgate system of FIG. 2, wherein the tailgate is in its raised, closed position and the movable tailgate portion is in its vertical, open/access position.

In one embodiment, the vehicle tailgate system 10 comprises a tailgate 14 and a support system 23 (as shown in FIGS. 6 and 8A-15). The tailgate 14 is pivotally mounted to a vehicle body 20 for movement about a generally horizontal pivot axis HX-HX (as shown in FIG. 1) between an open position (as shown in FIGS. 7A-10 and 12) in which the tailgate 14 extends generally horizontally along a vehicle bed 16 (as shown in FIG. 3) to allow access to a vehicle bed area 25 and a closed position (as shown in FIGS. 1-6) in which the tailgate 14 extends generally vertically to close access to the vehicle bed area 25. The tailgate 14 includes a movable tailgate portion 12 that is movably connected to the tailgate 14. As shown in FIGS. 1, 2 and 5, the movable tailgate portion 12 is configured to cover an access opening 21 (as shown in FIGS. 3 and 4) in the tailgate 14. The access opening 21 in the tailgate 14 is configured to provide access to the vehicle bed area 25 when the tailgate 14 is in the closed position and the movable tailgate portion 12 is pivoted to a downwardly extending open position (as shown in FIGS. 3, 4 and 6). The closed position and the open position of the tailgate 14 may also be referred to as the raised, closed position and the lowered, open position, respectively.

The support system 23 is selectively operable between a connected state connected to both the tailgate 14 and the movable tailgate portion 12 and a disconnected state. The support system 23 in the connected state is configured to support the movable tailgate portion 12 in a step position (as shown in FIGS. 9A-10 and 12) pivoted downwardly from the tailgate 14 in the open position thereof to provide a step 24. The support system 23 in the disconnected state is configured to allow the movable tailgate portion 12 to pivot downwardly from the tailgate 14 in the closed position thereof to the downwardly extending open position (as shown in FIGS. 3, 4 and 6). The angle of pivotal movement of the movable tailgate portion 12 relative to the tailgate 14 is greater in the downwardly extending open position (as shown in FIGS. 3, 4 and 6) than in the step position (as shown in FIGS. 9A-10 and 12).

That is, as shown in FIGS. 9A-10 and 12, the support system 23, when engaged with the movable tailgate portion 12, supports the movable tailgate portion 12 in the step position to provide the step 24 when the tailgate 14 is in the open position. As shown in FIGS. 3, 4 and 6, when the support system 23 is disengaged, the movable tailgate portion 12 is pivotable past the step position relative to the tailgate 14. That is, as will be clear from the discussions below, the support system 23 is engaged with the movable tailgate portion 12 for full deployment as the step 24. The support system 23 is disengaged from the movable tailgate portion 12 so that the movable tailgate portion 12 can fold over essentially a full 180 degrees to accommodate, for example, a fifth wheel trailer connection or otherwise provided access to the vehicle bed area 25 when the tailgate 14 is in the closed position.

Figure 9A:
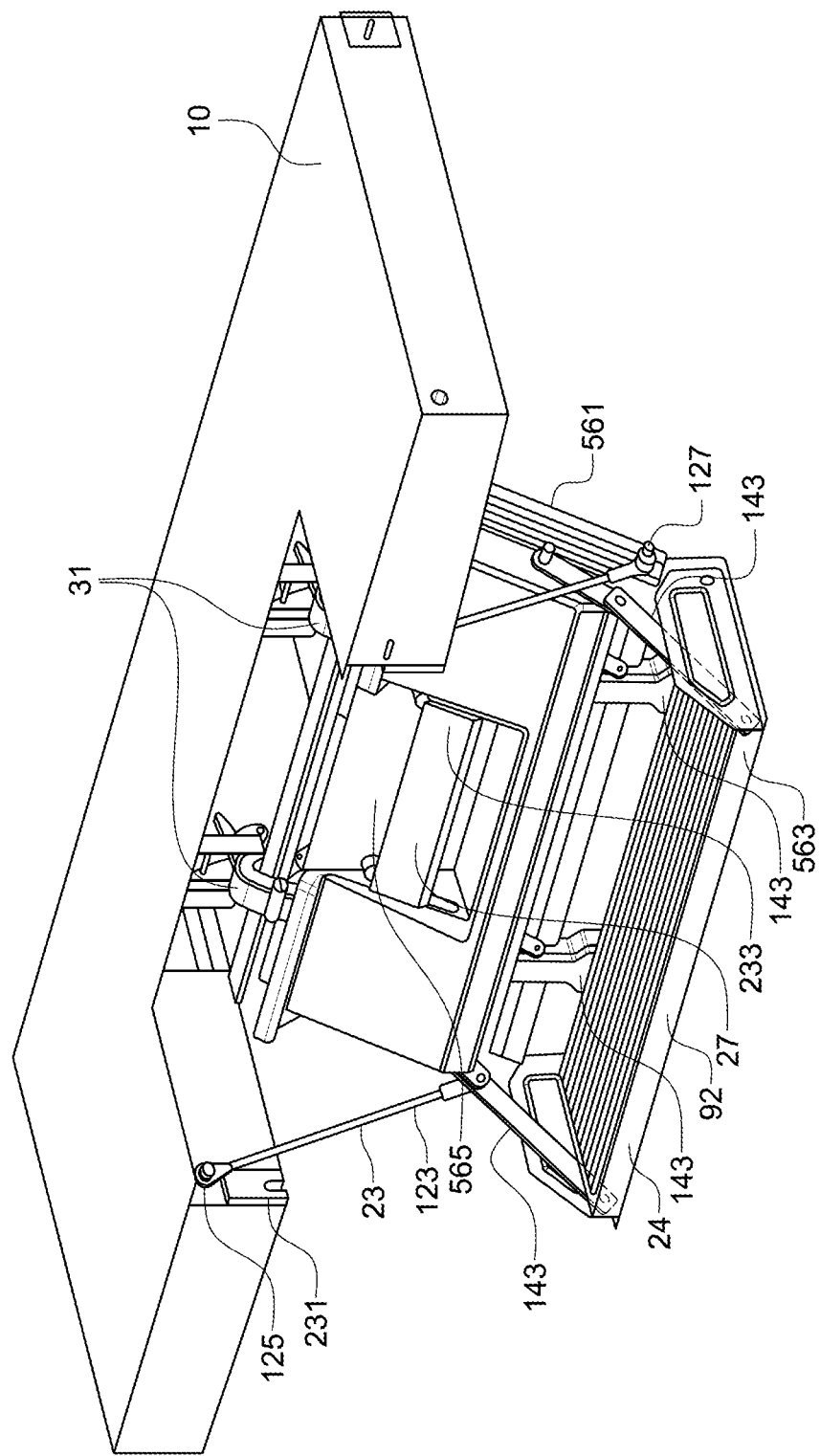
FIGS. 9A and 9B show perspective views of the vehicle tailgate system of FIG. 2, wherein the tailgate is in its lowered, open position and the movable tailgate portion is in its step position with a step feature deployed, and wherein a movable panel is in its closed/folded position in FIG. 9A and the movable panel is in its open/unfolded/step position to provide a supplemental step in FIG. 9B.
Figure 9B:
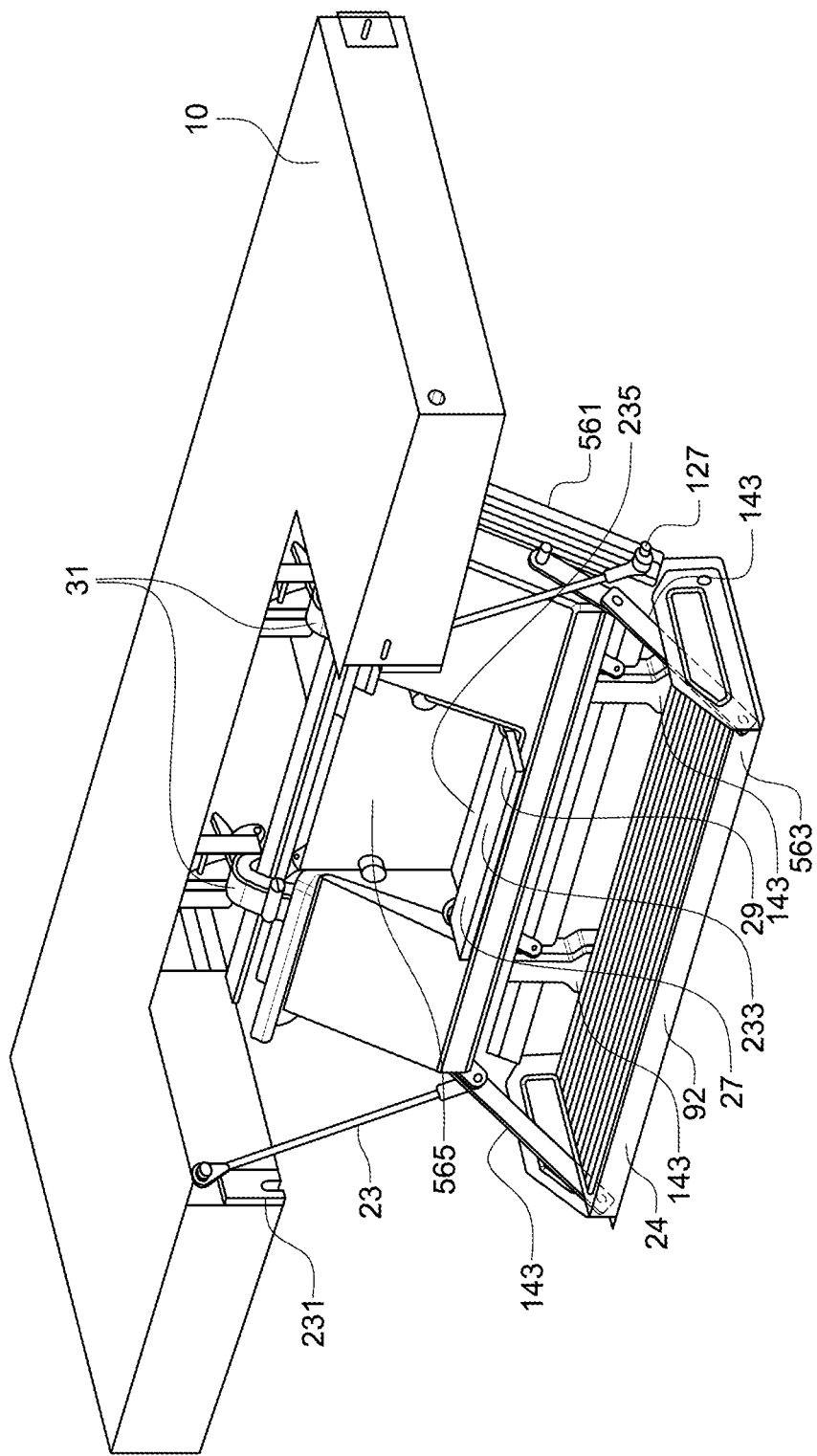
Figure 10:
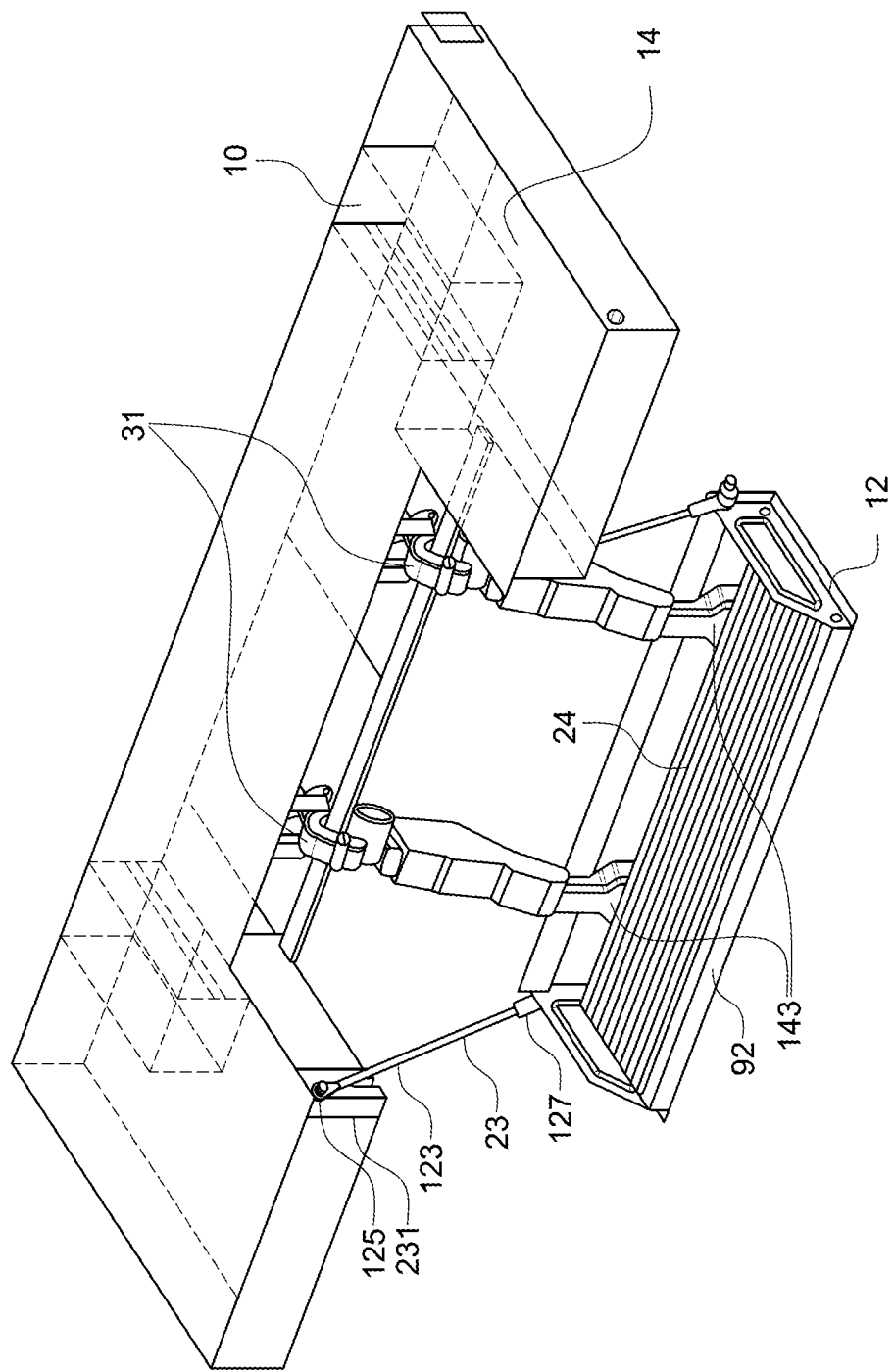
FIG. 10 shows a perspective view of the vehicle tailgate system of FIG. 2, wherein the tailgate is in its lowered, open position and the movable tailgate portion is in its step position.
Figure 11:
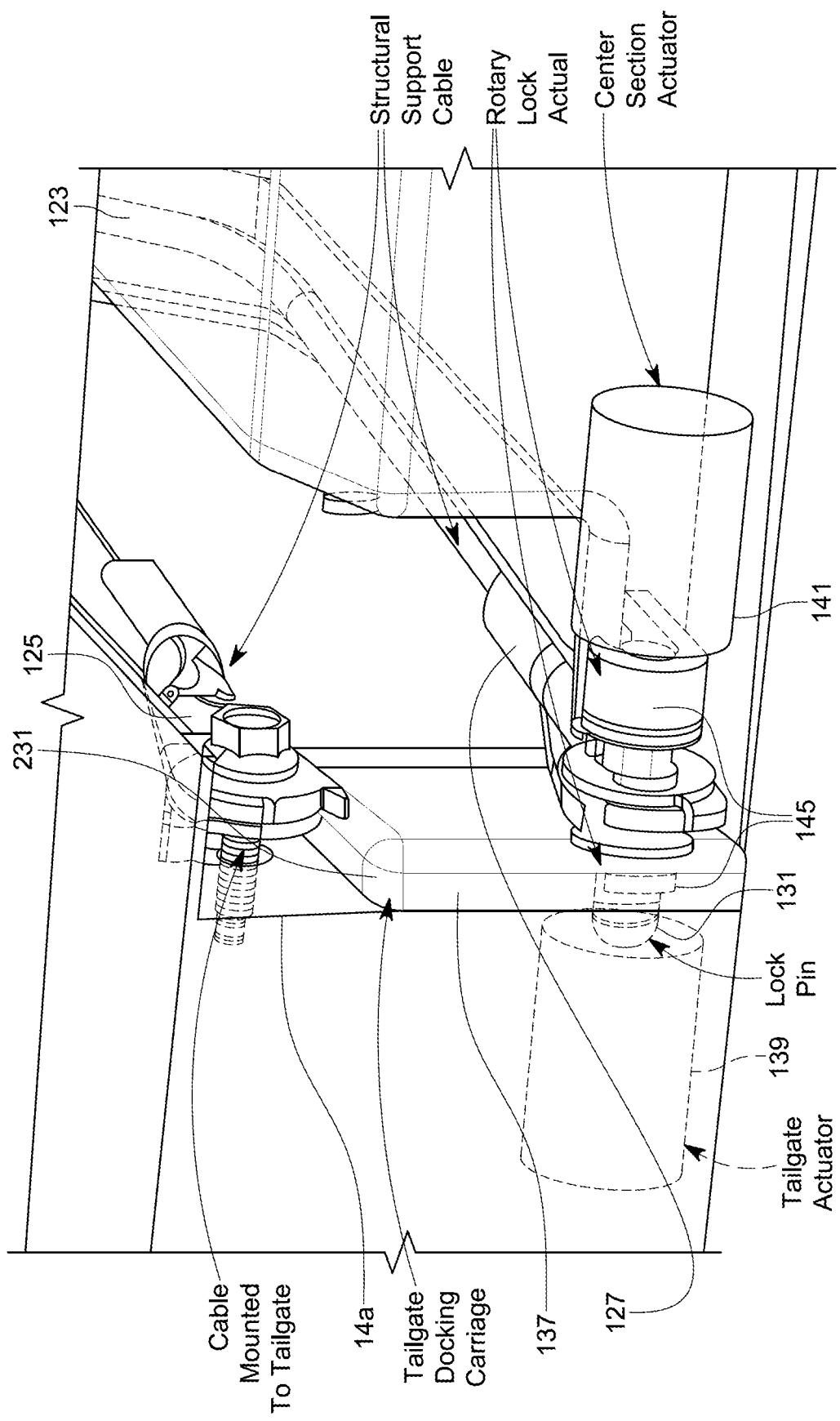
FIG. 11 shows a perspective view of a support assembly of the vehicle tailgate system in accordance with an embodiment of the present patent application.
Figure 12:
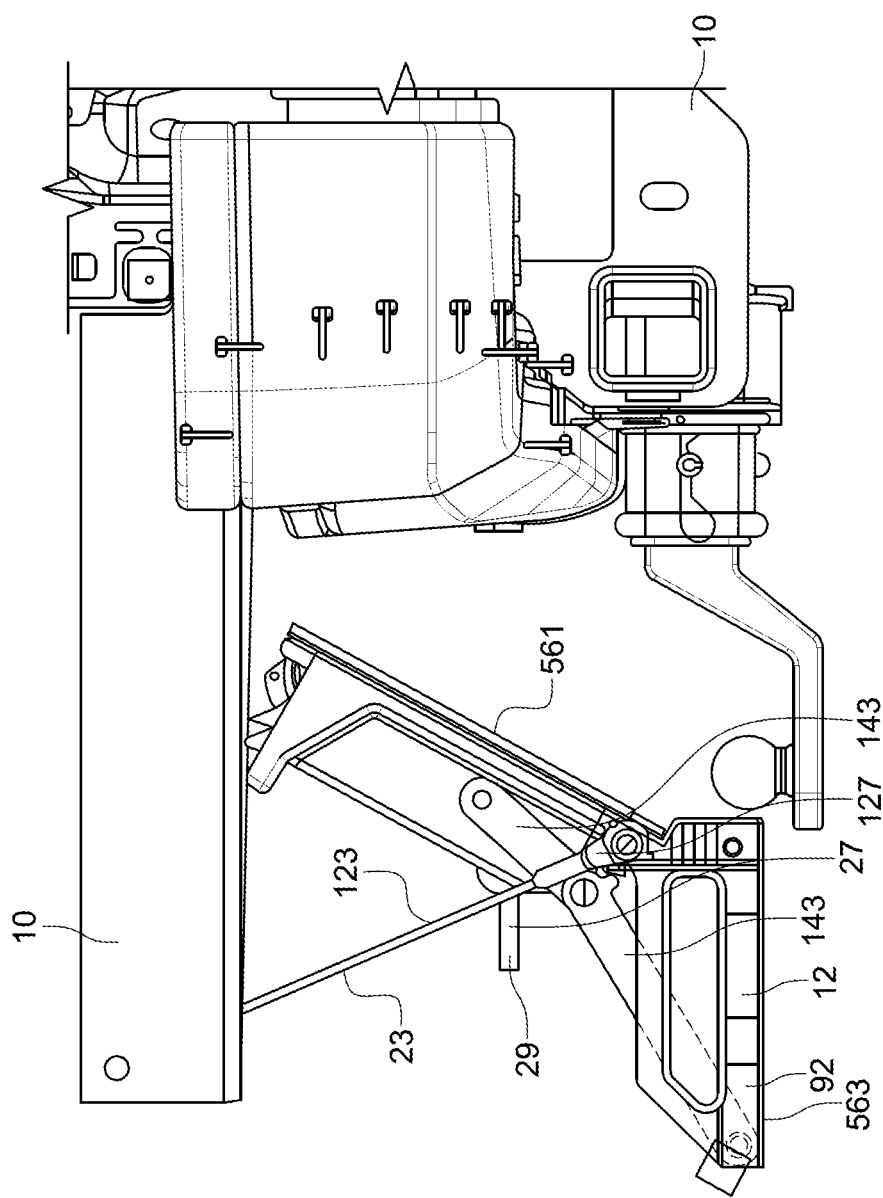
FIG. 12 shows a side view of the vehicle tailgate system in accordance with an embodiment of the present patent application, wherein the tailgate is in its lowered, open position, the movable tailgate portion is in its step position, and the movable panel is in its open/unfolded/step position to provide the supplemental step.
Figure 13:
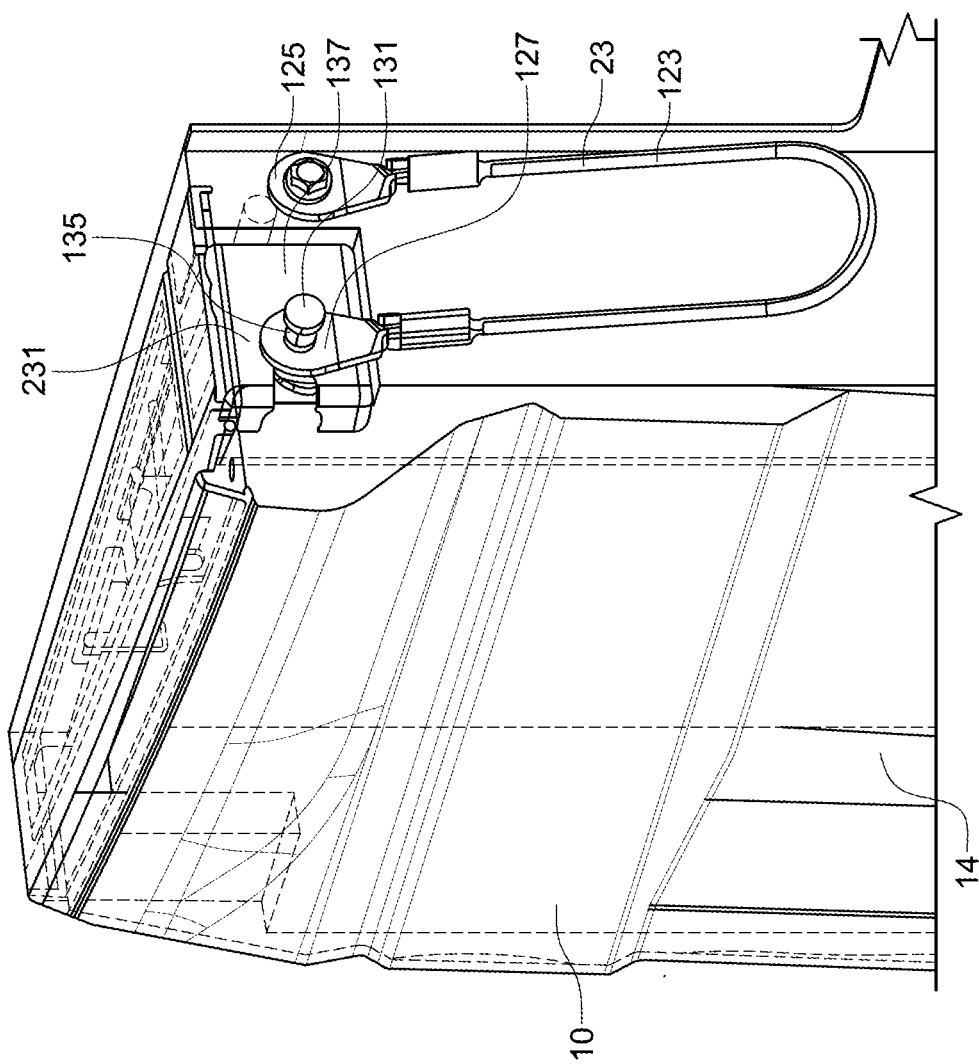
FIGS. 13-15 show perspective views of the support assembly of the vehicle tailgate system in accordance with an embodiment of the present patent application.

In one embodiment, as shown in FIGS. 9A, 9B and 12, the tailgate 14 also includes a movable panel 27 that is configured to provide a supplemental or intermediate step 29 between the aforementioned step 24 and the truck bed 16 when the movable tailgate portion 12 is in the step position and the tailgate 14 is in the open position.

In one embodiment, as shown in FIGS. 9A, 9B and 12, the movable tailgate portion 12 includes a first portion 561 and a second portion 563. In one embodiment, the second portion 563 is configured to move pivotably and outwardly away from the first portion 561, when the movable tailgate portion 12 is in the step position, to provide the step. The step is presented to the user for assistance to access to the truck bed when the tailgate 14 is in the open position and the movable tailgate portion 12 is pivoted to the step position.

In one embodiment, as shown in FIGS. 9A, 9B and 12, the movable panel 27 is pivotably connected to an inner surface 565 of the first portion 561. In one embodiment, the movable panel 27 is configured to move pivotably and outwardly away from the inner surface 565 of the first portion 561, when the movable tailgate portion 12 is in the step position, to provide the supplemental step. The supplemental step us presented to the user for assistance to access to the truck bed when the tailgate 14 is in the open position and the movable tailgate portion 12 is pivoted to the step position. In one embodiment, the movable panel 27 is separate from the movable tailgate portion 12.

In one embodiment, the vehicle 18 is a truck or pick-up truck. The tailgate 14 is generally configured to selectively close or allow access to the truck bed 16 area, for example, for loading or unloading cargo to or from the truck bed 16 area. The tailgate 14 may also be referred to as an endgate.

The tailgate 14 is pivotally mounted to the vehicle body 20 at a pick-up truck bed opening for movement about the generally horizontal pivot axis HX-HX (as shown in FIG. 1). The tailgate 14 extends generally horizontally along the truck bed opening. The tailgate 14 may be moved between the raised, closed position (as shown in FIGS. 1-6) extending generally vertically and the lowered, open position (as shown in FIGS. 7-10) extending generally horizontally, for example, using a pair of hinge mechanisms. In one embodiment, a hinge assembly is designed to be installed on the tailgate 14 for closing the truck bed opening on the pick-up truck 18. For example, the tailgate hinge mechanism mounts the tailgate 14 for pivotal/swinging movement between at least a first (e.g., closed) and a second (e.g., open) positions. In one embodiment, the truck 18 also allows for torque rods to assist in at least opening and/or closing the tailgate 14. Generally, the hinge mechanisms are provided on opposing sides of the tailgate 14, and are used to pivotally mount the tailgate 14 for movement about the generally horizontal pivot axis HX-HX with respect to the pick-up truck bed 16. The tailgates and the hinges for mounting them are well-known, and, therefore, are not described in detail here.

The frame of tailgate 14 and structure may be made of steel material. The frame of tailgate 14 and structure may be made of aluminum material.

Figure 7B:
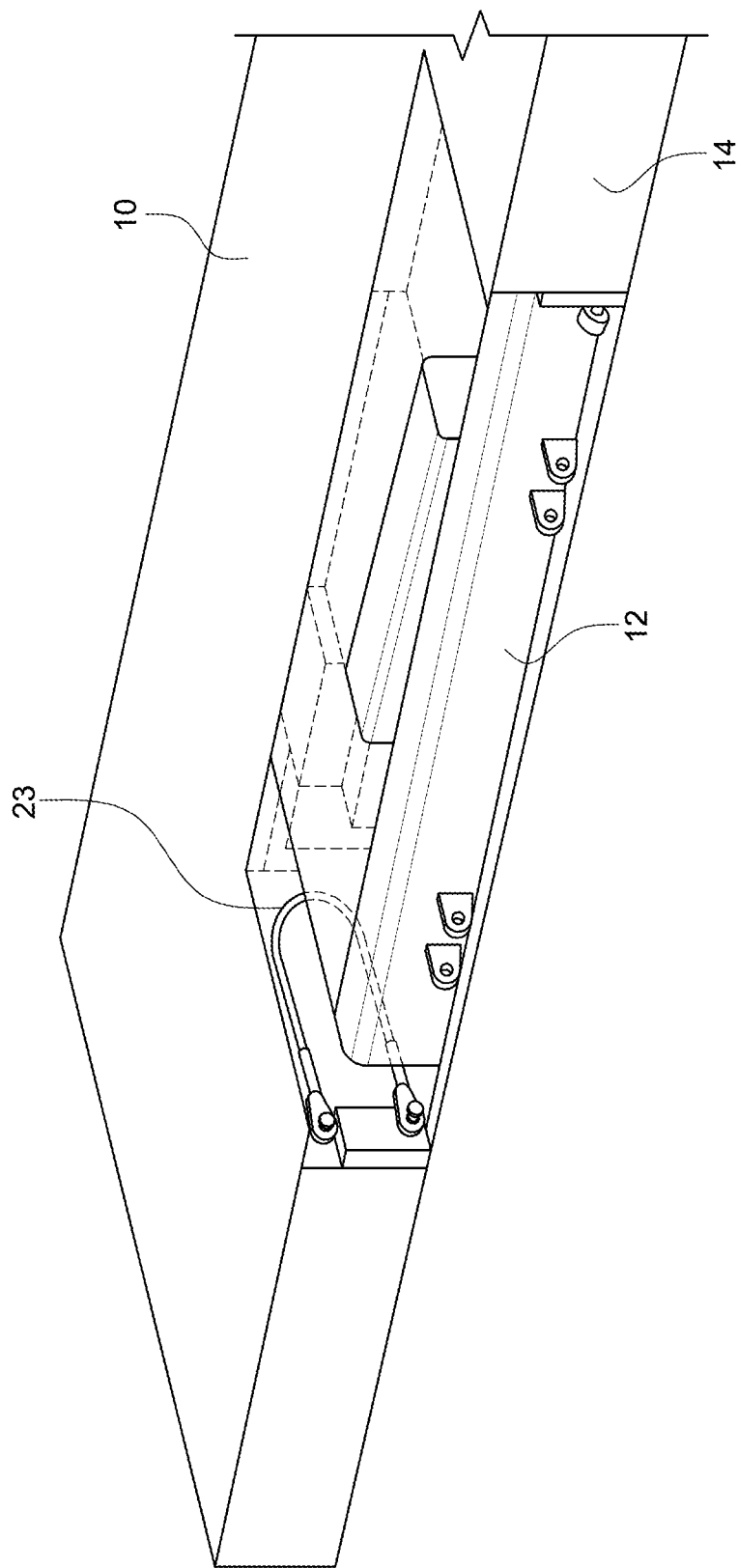
Figure 8A:
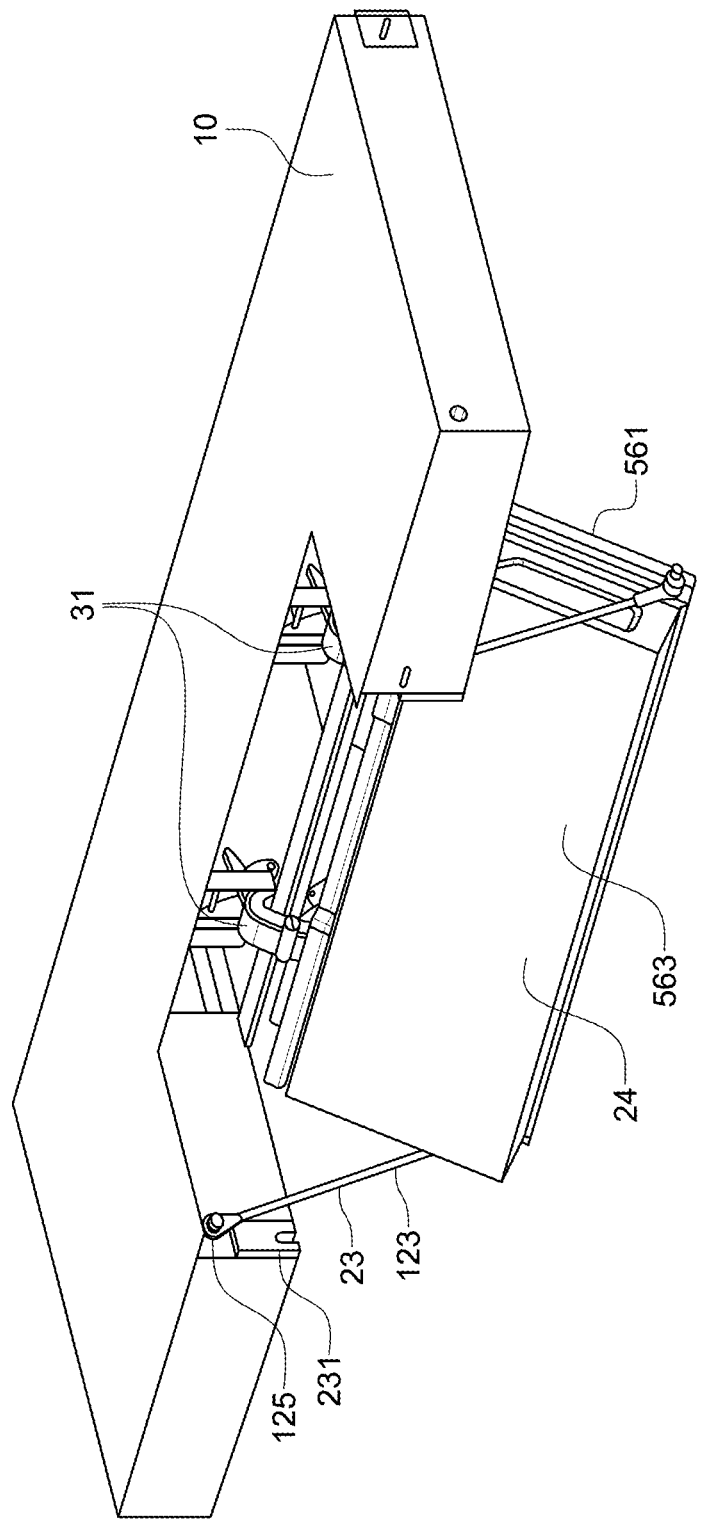
FIGS. 8A and 8B show perspective views of the vehicle tailgate system of FIG. 2, wherein the tailgate is in its lowered, open position and the movable tailgate portion is in its step position.
Figure 8B:
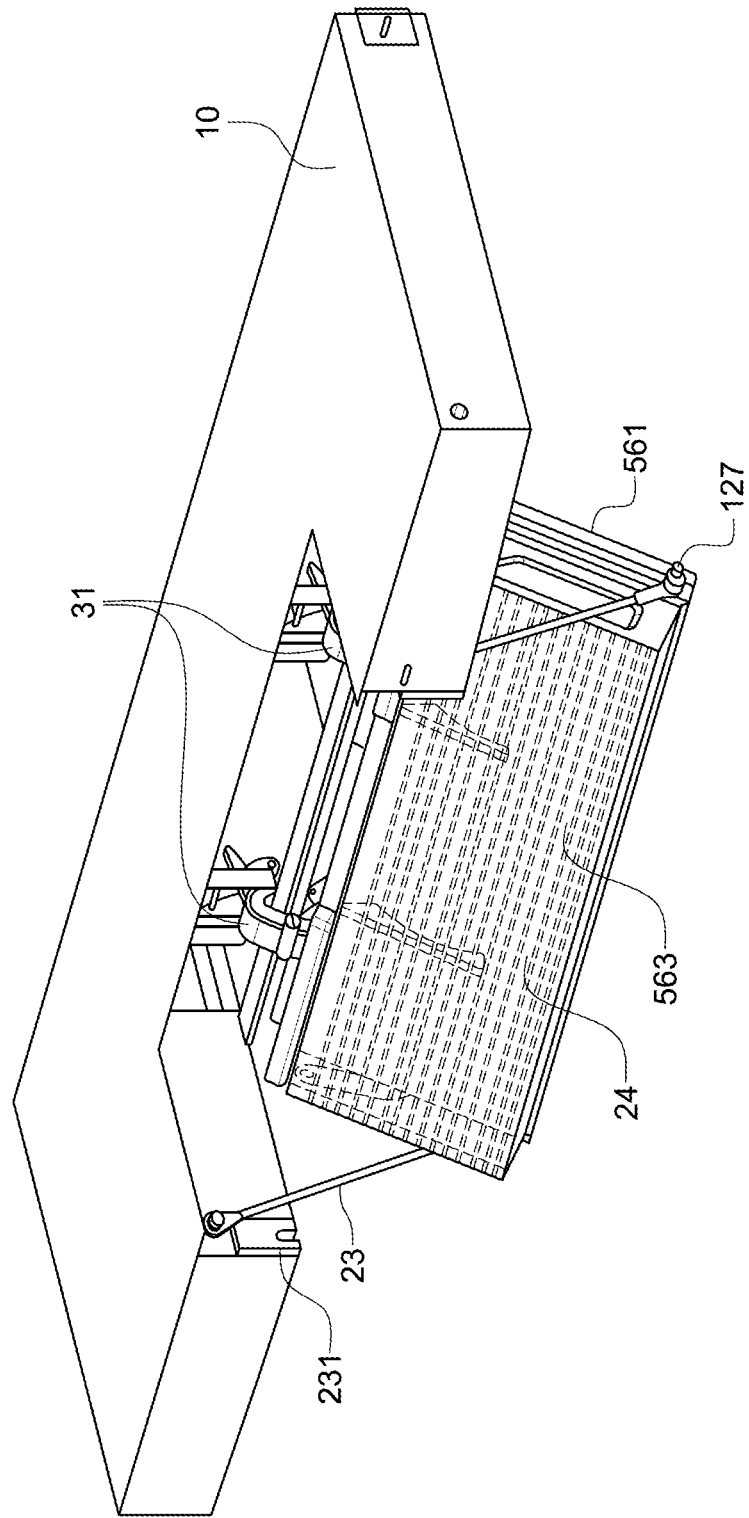

The movable tailgate portion 12 has multiple positions/configurations. FIGS. 1-2 and 5 show the movable tailgate portion 12 in its upright/vertical, closed position with the tailgate 14 in its closed position, and FIGS. 3-4 and 6 show the movable tailgate portion 12 in its vertical, open/access position also with the tailgate 14 in its closed position. FIGS. 7A and 7B show the movable tailgate portion 12 in its horizontal, closed position with the tailgate 14 in its open position. FIGS. 8A and 8B show the movable tailgate portion 12 in its released/drop-down (step) position also with the tailgate 14 in its open position. FIGS. 9A and 9B show the movable tailgate portion 12 in same released/drop-down (step) position with the deployed step feature 24.

The movable tailgate portion 12 may be panel member. The movable tailgate portion 12 may be in the upper portion of the tailgate 14. The movable tailgate portion 12 is generally in a center portion CP of the tailgate 14. The size of the movable tailgate portion 12 can range in width, up to approximately the complete width of the tailgate. For example, the movable tailgate portion 12 can range in size, from a small central section, referred to as a tailgate panel TP (as shown in FIGS. 2 and 4), to an extended section ES (as shown in FIGS. 1 and 3) that would be approximately the width dimension W of the tailgate 14, less the structural frame portions of the tailgate 14 on each side thereof. As shown in FIGS. 1 and 3, the movable tailgate portion 12 extends substantially across most of the width dimension W of the tailgate 14.

The movable tailgate portion 12 including its step features can be stamped or extruded metal (e.g., steel), as well as plastic molded designed into the panels.

The movable tailgate portion 12 includes the fold out step feature 24 and is hinged to the tailgate 12. The movable tailgate portion 12 is hingedly connected to the tailgate 14 to provide multi-purpose access to the truck bed 16. As clearly shown in FIG. 10, the movable tailgate portion 12 is connected to the frame of the tailgate 14 by hinges 31. In the illustrated embodiment, the movable tailgate portion 12 is connected to the tailgate frame 14 by two hinges 31. The number of hinges that are used to connect the movable tailgate portion 12 to the frame of the tailgate 14 may vary.

Referring to FIGS. 7A-9B, the movable tailgate portion 12 is pivotally mounted to the frame of the tailgate 14 for movement about a generally horizontal pivot axis. The movable tailgate portion 12 may be moved between its horizontal, closed position (as shown in FIGS. 7A and 7B) and its released/drop-down, step position extending generally vertically, for example, using the pair of hinge mechanisms 31. The movable tailgate portion 12 may also be moved between its horizontal, closed position (as shown in FIGS. 7A and 7B) and its released/drop-down, step position (as shown in FIGS. 8A-9B) extending generally angularly, for example, using the same pair of hinge mechanisms. For example, the hinge mechanism mounts the movable tailgate portion 12 for pivotal/swinging movement between its above-noted positions relative to the tailgate 14. Generally, the hinge mechanisms are provided on opposing sides of the movable tailgate portion 12 and/or the frame, and are used to pivotally mount the movable tailgate portion 12 for movement about the generally horizontal pivot axis with respect to the frame of the tailgate 14. The hinge mechanism may include two hinge portions, one of two hinge portions is connected to the frame of the tailgate 14 and the other of two hinge portions is connected to the movable tailgate portion 12. Hinges for mounting members for pivotal/swinging movement between their positions are well-known, and, therefore, are not described in detail here.

The hinged motion of the movable tailgate portion 12 may be accomplished with manual or electronic/power transmission methods. The hinge angle range and set positions can be designed to customer requirements. The hinge mechanisms/hinges 31 can be made from stamped or cast metal material.

In one embodiment, the hinges 31 are designed as sequence hinges, to allow for unhindered rotation of a tailgate cross section/movable tailgate portion 12. In one embodiment, the hinges 31 are configured to rotate and secure the movable tailgate portion 12 at multiple positions, up to a full essentially 180° of rotation (as shown in FIGS. 3, 4, and 6), used when the tailgate 14 is in the closed position. The movable tailgate portion 12 also includes the step 24 that is available when the tailgate 14 is open to the horizontal position. In one embodiment, the movable tailgate portion 12 is configured to rotate to its step position to a set angle, such as may be set per customer design requirements. When rotated in this position, mechanical and stationary step mechanisms and features are available, to allow the user of the vehicle 18 to step up for ease of access to the truck bed 16. As will be described in detail below, actuators and cables are also incorporated into the design to provide sequence of operation and structure for all of the mentioned features, in both the closed vertical position and the open horizontal position of the tailgate 14.

The movable tailgate portion 12 is movably connected to the tailgate 14 for movement between: a first configuration/position in which the movable tailgate portion 12 extends generally vertically and is disposed across the access opening 21 in the tailgate 14 in its closed position to close access to the vehicle bed area 25 via the access opening 21, or when the tailgate 14 is in its open position to serve as part of the tailgate surface extending from the truck bed; a second configuration/position in which the movable tailgate portion 12 moves to uncover the access opening 21 in the tailgate 14 in its closed position and extend downwardly (e.g., close to or essentially parallel to the tailgate 14) to provide access to the vehicle bed area 25 via the access opening 21; and a third configuration/position in which the movable tailgate portion 12 moves along with the tailgate 14 to the lowered, open position of the tailgate 14 to present the step feature 24 that provides access to the vehicle bed area 25.

In one embodiment, in the first configuration/position, the movable tailgate portion 12 is disposed across the access opening 21 in the tailgate 14 in its closed position to close access to the vehicle bed area 25 via the access opening 21. That is, in the first configuration/position, the movable tailgate portion 12 prevents horizontal access to the vehicle bed area 25 from the rear of the vehicle, i.e., irrespective of whether a cover covers the vehicle bed area 25 or not.

As shown in FIGS. 1 and 2, the movable tailgate portion 12 is in its upright/vertical, closed position and the tailgate 14 is in its raised, closed position. As shown in FIGS. 3 and 4, the vehicle tailgate system 10 is configured to provide the movable tailgate portion 12 that unfolds/uncovers the access opening 21 (as shown in FIGS. 3 and 4) in the tailgate 14 for ease of access into the pick-up truck bed 16 (as shown in FIG. 3) when the tailgate 14 is in its raised, closed position. The configuration/position of the movable tailgate portion 12, shown in FIGS. 3 and 4, is also configured to assist with a "fifth wheel" hitch connection (or any other type of hitch connection located inside the pick-up truck bed 16) as will be described in detail below. The vehicle bed, the truck bed and the pick-up truck bed are interchangeably used in the present patent application. The vehicle tailgate system 10 further provides the fold-out step 24 (as shown in FIGS. 7A-10) feature integrated into the movable tailgate portion 12 to assist with access to the truck bed 16 when the tailgate 14 is in its open position and the tailgate portion 12 is in its step position. The vehicle tailgate system 10 is configured to improve accessibility to the truck bed 16, both in a closed tailgate position (as shown in FIGS. 3-4, and 6) and an open tailgate position (as shown in FIGS. 9A-12).

In one embodiment, referring to FIG. 2, the tailgate 14 includes a right side portion RSP, a left side portion LSP and the central portion CP. In one embodiment, each of the left side portion LSP and the right side portion RSP of the tailgate 14 includes an inner panel, an outer panel and opposing side panels interconnecting the inner panel and the outer panel to define a compartment with an interior space therein. In one embodiment, the interior spaces of the compartments of the left side portion LSP and the right side portion RSP of the tailgate 14 are configured to receive components/mechanisms of the vehicle tailgate system 10. In one embodiment, the interior space of the compartments of the left side portion LSP and the right side portion RSP of the tailgate 14 may be used to store other storage items therein.

The outer panel 82 (as shown in FIGS. 1 and 2) of the movable tailgate portion 12 may be steel, aluminum or plastic. The outer panel 82 may be painted with customer/user desired colors and emblems. In the case of a plastic panel 82, an inner structural reinforcement (e.g., metallic or otherwise) may be used. The inner tailgate panel 84 (as shown in FIGS. 1 and 2) of the movable tailgate portion 12 may be made of plastic with a durable finish. The step feature 24 may be steel or aluminum, and depending on customer requirements, may even be plastic. In one embodiment, several weather-strip components along the length and the sides of the movable tailgate portion 12 may be required to ensure performance and functional requirements are met.

Referring to FIGS. 6 and 8A-15, the vehicle tailgate system 10 includes a support and lock assembly 231. In one embodiment, the support and lock assembly 231 includes the support system 23 including the at least one support member 123, at least one dock carriage 137 fixedly mounted to the tailgate 14, a tailgate actuator 139 mounted in the tailgate 14, at least one support carriage 153 fixedly mounted to the movable tailgate portion 12, and a movable tailgate portion actuator 141 mounted in the movable tailgate portion 12.

The support and lock assembly 231 includes structural support members 123, lock pins 131 with engaging features on both their ends 133 and 135, docking carriages 137 that are fixedly mounted to the frame of the tailgate 14, a tailgate actuator 139 mounted in the tailgate 14, support carriages 153 that are fixedly mounted to the movable tailgate portion 12, a movable tailgate portion actuator 141 mounted in the movable tailgate portion 12, and a rotary lock actuator 145.

The vehicle tailgate system 10 includes a clearance/space 151 (as shown in FIG. 6) that is formed between side end portions 12a, 12b (see FIGS. 2 and 3) of the movable tailgate portion 12 and inner side end portions 14a, 14b (see FIG. 3) of the tailgate 14 when the tailgate 14 is in its raised, closed position and the movable tailgate portion 12 is in its vertical, closed position. The support and lock assembly 231 is configured to be received in this clearance/space 151. Referring to FIG. 6, flange portion 14f of the tailgate 14 and flange portion 12f of the movable tailgate portion 12 enclose the clearance/space 151.

In one embodiment, the support system 23 includes at least one support member 123 that is disposed on a side 12a or 12b of the movable tailgate portion 12. In one embodiment, in the connected state of the support system 23, a portion of the at least one support member 123 is configured to be connected to the movable tailgate portion 12 to support the movable tailgate portion 12 in the step position pivoted downwardly from the tailgate 14 in the open position thereof to provide the step. In one embodiment, the at least one support member 123 includes two support members 123 that are disposed on opposing sides 12a, 12b of the movable tailgate portion 12. In one embodiment, the at least one support member 123 is a cable. The structural support member 123 may interchangeably referred to as a support member.

In one embodiment, the support and lock assembly 231 includes two structural support members 123 that are configured to support the step 24 in its deployed position, each disposed at one of the side end portion 12a, 12b (see FIG. 2) of the movable tailgate portion 12. That is, the structural support members 123 are provided on opposing sides of the movable tailgate portion 12. In one embodiment, the vehicle tailgate system 10 includes one structural support member 123. In one embodiment, the structural support member 123 and its corresponding lock pin 131 together may be referred to as the support system 23.

In one embodiment, the at least one support member 123 has a first end portion 125 and an opposing second end portion 127. In one embodiment, the first end portion 125 of the at least one support member 123 is fixedly connected to the tailgate 14 and the second end portion 127 of the at least one support member 123 is removably connectable to the tailgate 14 or the movable tailgate portion 12.

In one embodiment, the second end portion 127 of the at least one support member 123 includes a lock member 131. In one embodiment, in the connected state of the support system 23, the second end portion 127 of the at least one support member 123 is configured to be removably connected to the movable tailgate portion 12 to support the movable tailgate portion 12 in the step position pivoted downwardly from the tailgate in the open position thereof to provide the step. In one embodiment, in the disconnected state of the support system 23, the second end portion 127 of the at least one support member 123 is configured to be removably connected to the tailgate 14 to allow the movable tailgate portion 12 to pivot downwardly from the tailgate 14 in the closed position thereof to the downwardly extending open position.

Each structural support member 123 includes two ends 125 and 127. One end 125 of the structural support member 123 is fixedly connected to the frame of the tailgate 14 by a fastener. The end 125 of the structural support member 123 may have a rigid end connection portion to facilitate the connection between the structural support member 123 and the frame of the tailgate 14 using the fastener. Connection at end 125 may also be referred to as a permanent connection, as it remains connected at all times (except for repair purposes or the like). As will be described in detail below, the other end 127 of the structural support member 123 is selectively/removably connected to the tailgate 14 and/or the movable tailgate portion 12. In one embodiment, the structural support member 123 includes the lock pin 131 at its end 127. The end 127 of the structural support member 123 may have a rigid end connection portion to facilitate the connection between the structural support member 123 and the lock pin 131.

Figure 14:
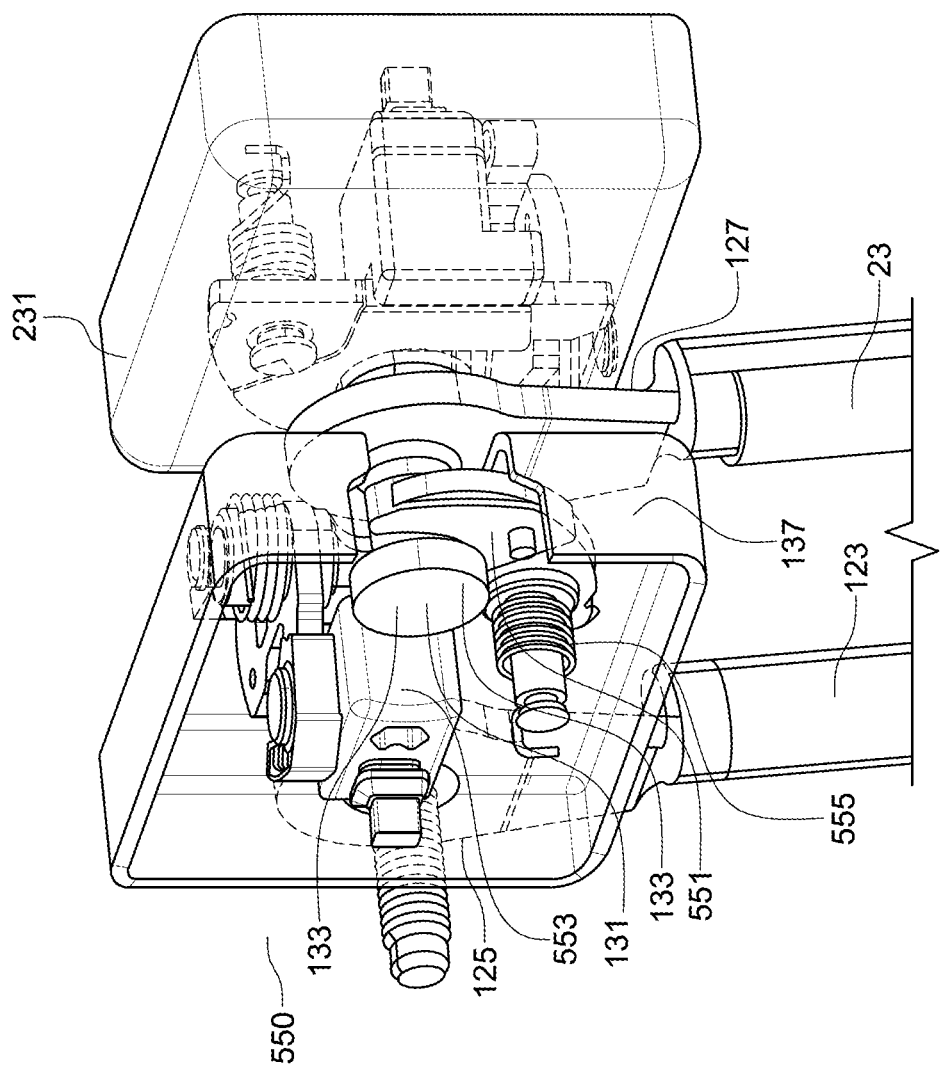
Figure 15:
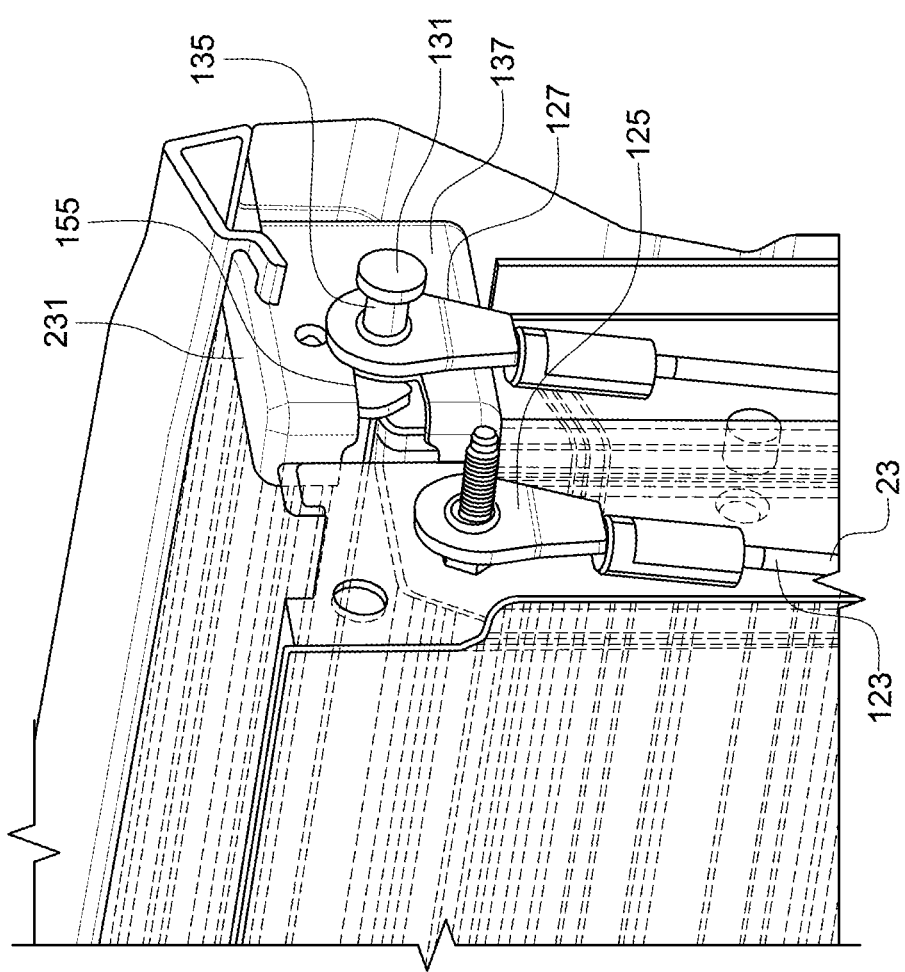

The structural support member 123 may be a cable. The structural support cable 123 can be made of stainless steel material or other materials. The structural support cable 123 may have an outer (protective) sleeve that is configured to protect the structural support cable 123 from any external damage. In one embodiment, instead of a cable configuration, the structural support member 123 may include two or more (foldable or flexible) linkages that are configured to engage with the movable tailgate portion 12 to support the movable tailgate portion 12 in its step position to provide the step 24, and to disengage from the movable tailgate portion 12 so as to allow the movable tailgate portion 12 to be pivotable past the step position relative to the tailgate 14 (i.e., into its vertical, open/access position as shown in FIGS. 3, 4 and 6). The linkages of the structural support member 123 can be made of stainless steel material or other materials. In one embodiment, the support and lock assembly 231 includes the at least one dock carriage 137. The dock carriage may be interchangeably referred to as a docking carriage. In one embodiment, the at least one dock carriage 137 includes a latch mechanism 550 (as shown in FIG. 14). In one embodiment, the latch mechanism of the at least one dock carriage 137 includes a latch member 551 (as shown in FIG. 14) that is configured to be movable between a lock position in which the latch member 551 engages with and locks the lock member 131 in the at least one dock carriage 137 and an unlock position permitting the lock member 131 to be released from the at least one dock carriage 137. In one embodiment, the latch mechanism of the at least one dock carriage 137 also includes a lock pawl 553 (as shown in FIG. 14) that engages with the latch member 551 to maintain the latch member 551 in its lock position and also allows the latch member 551 to be moved between its lock and unlock positions. In one embodiment, the at least one dock carriage 137 includes a recess 155 for the lock member 131. In one embodiment, the recess 155 of the at least one dock carriage 137 allows the lock member 131 to travel therein until the lock member 131 engages with the latch member 551. In one embodiment, when the lock member 131 is disengaged from the latch member of the at least one dock carriage 137, the lock member 131 travels along the recess 155 to be released from the at least one dock carriage 137.

In one embodiment, the support and lock assembly 231 includes two docking carriages 137. Each docking carriage 137 is fixedly mounted to one of the two inner side portions 14a, 14b of the frame of the tailgate 14. In one embodiment, each docking carriage 137 is positioned in the clearance/space 151 on their respective side. Each docking carriage 137 includes the latch member 551 that is configured to be rotated/pivotable between a lock position in which the latch member 551 engages with and locks the end portion of the lock pin 131 in the docking carriage 137 and an unlock position permitting the end portion of the lock pin 131 to be released from the docking carriage 137. Each docking carriage 137 also includes the lock pawl 553 that engages with the latch member 551 to maintain the latch member 551 in its lock position and also allows the latch member 551 to be rotated between its lock and unlock positions. Each docking carriage 137 may include springs 555 (as shown in FIG. 14) that are configured to apply a force on the respective latch member 551. The docking carriage 137 also includes a cut-out recess 155 for the lock pin 131. That is, when the lock pin 131 is disengaged/unlocked from the latch member 551, the lock pin 131 travels along the cut-out recess 155 to be released from the docking carriage 137. Also, the cut-out recess 155 allows the lock pin 131 to travel therein until the lock pin 131 engages with the latch member 551 (and gets locked by the latch member 551). The latch member 551, the springs 555, the lock pawl 553 of the docking carriage 137 may be together referred to as the latch mechanism 550 of the docking carriage 137.

The support and lock assembly 231 includes two support carriages 153. Each support carriage 153 is fixedly mounted to one of the two side portions 12a, 12b of the movable tailgate portion 12. In one embodiment, each support carriage 153 is positioned in the clearance/space 151 on their respective side. In one embodiment, the at least one support carriage includes a latch mechanism. In one embodiment, the latch mechanism of the at least one support carriage includes a latch member that is configured to be movable between a lock position in which the latch member engages with and locks the lock member in the at least one support carriage and an unlock position permitting the lock member to be released from the at least one support carriage. In one embodiment, the latch mechanism of the at least one support carriage also includes a lock pawl that engages with the latch member to maintain the latch member in its lock position and also allows the latch member to be moved between its lock and unlock positions. In one embodiment, the at least one support carriage includes a recess for the lock member. In one embodiment, the recess of the at least one support carriage allows the lock member to travel therein until the lock member engages with the latch member. In one embodiment, when the lock member is disengaged from the latch member of the at least one support carriage, the lock member travels along the recess to be released from the at least one support carriage.

The configuration, structure and operation of the support carriage 153 are similar to the configuration, structure and operation of the docking carriage 137 described above. For example, each support carriage 153 includes a cut-out recess, a latch member, a lock pawl, springs, etc. that are configured to operate in the same manner as described above with the docking carriage 137. The latch member, the springs, the lock pawl of the support carriage 153 may be together referred to as a latch mechanism of the support carriage 153.

The support and lock assembly 231 includes two lock pins 131. In one embodiment, the structural support member 123 and its corresponding lock pin 131 together may be referred to as the support system 23.

The lock pins 131 are disposed on both sides of the movable tailgate portion 12, as mentioned above. The lock pins 131 are connected to the ends 127 of the structural support members 123. Each lock pin 131 include engaging features on both its ends 133 and 135. For example, the end portions 133 of the lock pins 131 are configured to engage with/disengage from the latch mechanisms of the docking carriages 137 and the end portions 135 of the lock pins 131 are configured to engage/disengage from the latch mechanisms of the support carriages 153.

The support and lock assembly 231 includes the tailgate actuator 139 that is disposed in the tailgate 14. In one embodiment, the tailgate actuator 139 is a mechanical actuator. In another embodiment, the tailgate actuator 139 is an electronic actuator. The tailgate actuator 139 is operatively connected to the latch mechanisms (e.g., pawls) of the docking carriages 137.

The tailgate actuator 139 is configured to cause the latch mechanisms of the docking carriages 137 to unlock the lock pins 131 and release/disengage the lock pin 131 and the ends 127 of the structural support members 123 connected thereto from the frame of the tailgate 14 when the movable tailgate portion 12 is being moved to its step configuration (as shown in FIGS. 9A-10 and 12) so that the movable tailgate portion 12, when in the step position, is supported by the structural support members 123 with the ends 127 of the structural support members 123 connected to the movable tailgate portion 12 and the ends 125 of the structural support members 123 fixedly connected to the frame of the tailgate 14. In other words, the pins 131 will remain connected to the movable tailgate portion 12 via its support carriages and the latches therein in their locked position, whereby when the movable tailgate portion 12 is pivoted to the step position the support members 123 will support the movable tailgate portion 12 in the step position below the open tailgate 14.

The tailgate actuator 139 is also configured to cause the latch mechanisms of the docking carriages 137 to engage with and lock the lock pins 131 and the ends 127 of the structural support members 123 connected thereto with the frame of the tailgate 14 when the movable tailgate portion 12 is moved to its vertical, open/access position (as shown in FIGS. 3, 4 and 6). That is, both ends 125 and 127 of the structural support members 123 are connected to the frame of the tailgate 14 to enable the 180 degree movement of the movable tailgate portion 12 to its vertical, open/access position (as shown in FIGS. 3, 4 and 6). In other words, the pins 131 will remain connected to the tailgate 14 via its docking carriages and the latches therein in their locked position, whereby the movable tailgate portion 12 can pivot down to that vertical position from the closed tailgate 14. That range of motion is greater than if the support members 123 remained connected to the movable tailgate portion 12.

The support and lock assembly 231 includes the movable tailgate portion actuator 141 that is disposed in the movable tailgate portion 12. In one embodiment, the movable tailgate portion actuator 141 is a mechanical actuator. In another embodiment, the movable tailgate portion actuator 141 is an electronic actuator. The movable tailgate portion actuator 141 is operatively connected to the latch mechanisms (e.g., pawls) of the support carriages 153.

The movable tailgate portion actuator 141 is configured to cause the latch mechanisms of the support carriages 153 to engage with and lock the lock pins 131 and the ends 127 of the structural support members 123 connected thereto to the movable tailgate portion 12 when the movable tailgate portion 12 is being moved to its step configuration (as shown in FIGS. 9A-10 and 12) so that the movable tailgate portion 12, when in the step position, is supported by the structural support members 123 with the ends 127 of the structural support members 123 connected to the movable tailgate portion 12 and the ends 125 of the structural support members 123 fixedly connected to the frame of the tailgate 14.

The movable tailgate portion actuator 141 is also configured to cause the latch mechanisms of the support carriages 153 to disengage/release the lock pins 131 and the ends 127 of the structural support members 123 connected thereto from the movable tailgate portion 12 when the movable tailgate portion 12 is being moved to its vertical, open/access position (as shown in FIGS. 3, 4 and 6). That is, both ends 125, 127 of the structural support members 123 are connected to the frame of the tailgate 14 to enable the 180 degree movement of the movable tailgate portion 12 into its vertical, open/access position (as shown in FIGS. 3, 4 and 6).

The operations of the movable tailgate portion actuator 141 and the tailgate actuator 139 may be synchronized so that, when the movable tailgate portion 12 is being moved to its vertical, open/access position (as shown in FIGS. 3, 4 and 6), the movable tailgate portion actuator 141 causes the latch mechanisms of the support carriages 153 to disengage/release the lock pins 131 and the ends 127 of the structural support members 123 connected thereto from the movable tailgate portion 12 at the same time as the tailgate actuator 139 causes the latch mechanisms of the docking carriages 137 to engage with and lock the lock pins 131 and the ends 127 of the structural support members 123 connected thereto with the frame of the tailgate 14.

Similarly, when the movable tailgate portion 12 is being moved to its step configuration (as shown in FIGS. 9A-10 and 12), the tailgate actuator 139 causes the latch mechanisms of the docking carriages 137 to unlock the lock pins 131 and release/disengage the lock pin 131 and the ends 127 of the structural support members 123 connected thereto from the frame of the tailgate 14 at the same time as the movable tailgate portion actuator 141 causes the latch mechanisms of the support carriages 153 to engage with and lock the lock pins 131 and the ends 127 of the structural support members 123 connected thereto to the movable tailgate portion 12.

The support and lock assembly 231 also includes the lock actuator 145 that is configured to lock and unlock/release the movable tailgate portion 12 to/from the frame of the tailgate 14. In one embodiment, the lock actuator 145 is a rotary lock actuator. In one embodiment, when a handle provided on the vehicle 18 is operated, it triggers the lock actuator 145 that allows the movable tailgate portion 12 to disengage from the frame of the tailgate 14, and pivot about the hinges 31. When the movable tailgate portion 12 is rotated back into its vertical, closed position, the lock actuator 145 is triggered to lock the movable tailgate portion 12 securely to the frame of the tailgate 14. In one embodiment, the lock actuator 145 is a mechanical actuator. In another embodiment, the lock actuator 145 is an electronic actuator.

The lock actuator 145 is operatively associated with a lock mechanism that is configured to lock and unlock/release the movable tailgate portion 12 to/from the frame of the tailgate 14. The lock mechanism includes a latch member, a lock pawl, springs, etc. that are configured to the operate in the same manner as described above with respect to the docking carriage 137. The lock mechanism is disposed in one of the movable tailgate portion 12 and the tailgate 14 and is configured to engage with a lock pin that is connected to the other of the movable tailgate portion 12 and the tailgate 14.

The operations of the movable tailgate portion actuator 141 and the tailgate actuator 139 may also be synchronized with the operation of the lock actuator 145. In one embodiment, the same handle (provided on the vehicle 18) that is operated to trigger the lock actuator 145 is also used to trigger both the movable tailgate portion actuator 141 and the tailgate actuator 139.

In one embodiment, the lock actuator 145 is optional. In such an embodiment, the movable tailgate portion actuator 141 and the tailgate actuator 139 are also used to lock and unlock/release the movable tailgate portion 12 to/from the frame of the tailgate 14. For example, when the movable tailgate portion 12 is moved back into its vertical, closed position, the movable tailgate portion actuator 141 and the tailgate actuator 139 are triggered to lock the portions 133 of the lock pins 131 in the latch mechanisms of the docking carriages 137 and lock the portions 135 of the lock pins 131 in the latch mechanisms of the support carriages 153, thus, locking the movable tailgate portion 12 securely to the frame of the tailgate 14. When the movable tailgate portion 12 is being moved to its vertical, open/access position, the movable tailgate portion actuator 141 is triggered to unlock the portions 135 of the lock pins 131 from the latch mechanisms of the support carriages 153, thus, unlocking the movable tailgate portion 12 from the frame of the tailgate 14. When the movable tailgate portion 12 is being moved to its step position, the tailgate actuator 139 is triggered to unlock the portions 133 of the lock pins 131 from the latch mechanisms of the docking carriages 137, thus, unlocking the movable tailgate portion 12 from the frame of the tailgate 14 for movement (yet being supported by the support system 23).

The vehicle tailgate system 10 also includes a lock assembly configured to lock the movable tailgate portion 12 with respect to the frame of the tailgate 14 in each of its various positions. That is, the lock assembly is configured to be in its lock position when the movable tailgate portion 12 is in or moving between its positions so as to prevent any relative movement between the movable tailgate portion 12 and the frame of the tailgate 14. The lock assembly is configured to be moved from its lock position to its unlock position to enable the movement of the movable tailgate portion 12 with respect to the frame of the tailgate 14 and from its horizontal, closed position (as shown in FIGS. 7A and 7B) to the released drop-down, step position (as shown in FIGS. 9A and 9B). The lock assembly includes a lock engagement portion and a lock portion. One of the lock engagement portion and the lock portion is connected to the movable tailgate portion 12 and the other of the lock engagement portion and the lock portion is connected to the frame of the tailgate 14.

As shown in FIGS. 3-4, and 6, the vehicle tailgate system 10 is configured to provide open accessibility with 180 degrees hinge operation when the tailgate 14 is in the vertical, closed position. That is, the movable tailgate portion 12 of the tailgate 14 can be rotated 180 degrees to allow access to the truck bed 16/truck bed area 25 while standing at the back of the vehicle 18.

The movable tailgate portion 12 is released from the frame of the tailgate 14 by the handle provided on the vehicle 18 for this function. The handle can be mechanical, electronic or any combination thereof. The activation could also be wireless, such as a key fob transmitter that sends a wireless signal. When the handle is operated, it triggers the lock actuator 145 that allows the movable tailgate portion 12 to disengage from the frame of the tailgate 14, and pivot about the hinges 31. Additionally, with the same handle operation, a separate set of actuators (e.g., the tailgate actuator 139 and the movable tailgate portion actuator 141) are configured to disengage the structural support cable 123 from the movable tailgate portion 12. For example, the portions 135 of the lock pins 131 (at the ends 127 of the structural support cables 123) disengage from portions of the latch mechanisms in the support carriages 153 and the portions 133 of the lock pins 131 engage and lock with portions of the latch mechanisms in the docking carriages 137. When disengaged from the movable tailgate portion 12, the lock pins 131 are docked into the docking carriages 137 mounted to the frame of the tailgate 14, with the tailgate actuator 139 to secure it in place. The ends 127 of the structural support cables 123 are thus connected to the frame of the tailgate 14. When the movable tailgate portion 12 is disengaged, it is allowed to rotate 180 degrees, to provide access to the truck bed 16 without completely opening the tailgate 14 (or opening the complete tailgate assembly). The movable tailgate portion 12 can be closed by rotating upward, and in doing so, the actuators are activated to secure movable tailgate portion 12 back to the frame of the tailgate 14.

The reason for disengaging the support system 23 from the movable tailgate portion 12 is provide the movable tailgate portion 12 with an ability to go past its supported/step position. The support system 23 is configured to disengage from the movable tailgate portion 12 so that the movable tailgate portion 12 moves to uncover the access opening 21 in the tailgate to provide access to the vehicle bed area 25 via the access opening 21 when the tailgate 14 is in its raised, closed position.

The 180 degree or downwardly extending folding configuration of the movable tailgate portion 12 is configured to assist with reverse operation of the truck/vehicle 18 and assist with the fifth wheel connection. That is, the present patent application provides the movable tailgate portion 12 with both step feature and the 180 degree or downward folding configuration. The folding need not be a full 180 degrees, but the movable tailgate portion 12 extends down to fully open the access opening, which allows for access to the truck bed.

The support system 23 is also configured to engage with the movable tailgate portion 12 when the movable tailgate portion 12 moves along with the tailgate 14 to the lowered, open position of the tailgate 14 to present the step 24 that provides for access to the vehicle bed area 25, and to support the movable tailgate portion 12 during deployment and use of the step.

That is, the vehicle tailgate system 10 also provides step feature accessibility when the tailgate 14 is in the open, horizontal position. The movable tailgate portion 12 of the tailgate 14 can be rotated to a set position, which can be between 45 degrees and 90 degrees, depending on customer design preference. An angle less than 90 degrees may be beneficial to avoid contact with trailer hitches or a larger rear bumper. The movable tailgate portion 12 is released from the frame of the tailgate 14 by the handle provided on the vehicle 18 for this function. When the handle is operated, it triggers the lock actuator 145 that allows the movable tailgate portion 12 to disengage from the frame of the tailgate 14, and pivot about the hinges 31 to the set position.

Additionally, with the same handle operation, the separate set of actuators (e.g., the tailgate actuator 139 and the movable tailgate portion actuator 141) are configured to lock the structural support cables 123 to the movable tailgate portion 12. For example, the portions 133 of the lock pins 131 disengage from portions of the latch mechanisms in the docking carriages 137 and the portions 135 of the lock pins 131 (at the ends 127 of the structural support cables 123) engage and lock with portions of the latch mechanisms in the support carriages 153.

When engaged with the movable tailgate portion 12, the lock pins 131 are secured/locked by the movable tailgate portion actuator 141 to the support carriages 153 mounted to the movable tailgate portion 12. The ends 127 of the structural support cables 123 are thus connected to the movable tailgate portion 12 (and the ends 125 of the structural support cables 123 are connected to the frame of the tailgate 14). Thus, the structural support cables 123 provide the structural support for the step features.

When the opening of the movable tailgate portion 12 is complete, the user can unfold the step feature 24 that is packaged into the movable tailgate portion 12. In one embodiment, the movable tailgate portion 12 is moved from its horizontal closed position as shown in FIGS. 7A and 7B) to its step position (as shown in FIGS. 8A and 8B), while the movable tailgate portion 12 being supported by the structural support cable 123, to unfold the step feature 24.

The step feature 24 is mounted with hinges 143 (as shown in FIGS. 9A-10 and 12) to the movable tailgate portion 12 that allow the step feature 24 to rotate to a horizontal position for the user to step up and get access to the truck bed 16. The hinge may include two hinge portions, one of two hinge portions is connected to the movable tailgate portion 12 and the other of two hinge portions is connected to the step 24. Hinges for mounting members for pivotal or swinging movement between their positions are well-known, and, therefore, are not described in detail here.

The step 24 is pivotally mounted to the movable tailgate portion 12 for movement about a generally horizontal pivot axis. The step 24 may be moved between its stored position (as shown in FIGS. 8A and 8B) and its deployed position (as shown in FIGS. 9A and 9B) extending generally horizontally using the pair of hinge mechanisms 143. For example, the hinge mechanism 143 mounts the step 24 for pivotal/swinging movement between its above-noted positions. Generally, the hinge mechanisms are provided on a central region and opposing sides of the step 24, and are used to pivotally mount the step 24 for movement about the generally horizontal pivot axis with respect to the movable tailgate portion 12. The hinge mechanism includes one (or two) side hinge mechanism 143 disposed on the sides of the step 24/movable tailgate portion 12 and a center hinge mechanism 143 that is disposed in a central position of the step 24/movable tailgate portion 12.

The structural retention and rotation of the movable tailgate portion 12 and the step 24 are achieved through center/mid hinges, latches and the structural support members 123. All of these features can be locked and released manually, mechanically, electronically and/or automatically.

In the horizontal, closed position, the movable tailgate portion 12 can be rotated vertically 90 degrees or less than 90 degrees, then a center panel 92 (FIGS. 9A and 9B) of the movable tailgate portion 12 can rotate horizontally 90 degrees or more to present the step feature 24 for the user for access to the truck bed 16. Likewise, the tailgate 14 could be lowered to its open position and then the movable tailgate portion 12 can be lowered to its step position. As shown in FIGS. 9A and 9B, the vehicle tailgate system 10 is configured to provide the step 24 for the truck bed 16 ingress and egress. The vehicle tailgate system 10 is configured to provide accessibility to the truck bed 16 for small and large cargo loading.

The step 24 includes at least a stored position (as shown in FIGS. 8A and 8B) and a use/deployed position (as shown in FIGS. 9A and 9B). The step 24 is configured to assist the user for entering/stepping into or exiting/stepping out of the truck bed 16 at the rear of the pickup truck 18. In one embodiment, the vehicle tailgate system 10 includes a lock configured to lock/secure the step 24 when it is in its stored position. The lock is configured to be moved from its lock position to its unlock position to enable the movement of the step 24 with respect to the movable tailgate portion 12 and from its stored position (as shown in FIGS. 8A and 8B) to the deployed position (as shown in FIGS. 9A and 9B). The lock includes a lock engagement portion and a lock portion. One of the lock engagement portion and the lock portion is connected to the movable tailgate portion 12 and the other of the lock engagement portion and the lock portion is connected to the step 24. In one embodiment, the step includes one or more textured portions that are configured to enhance a user's grip when stepping upon and using the step 24.

In one embodiment, dampers or springs may be used with the movable tailgate portion 12 to control its movement between its horizontal, closed position (as shown in FIGS. 7A and 7B) and its released drop-down position (as shown in FIGS. 8A-9B). In one embodiment, dampers or springs may be used with the step 24 to control its movement between its stored position (as shown in FIGS. 8A and 8B) and its deployed position (as shown in FIGS. 9A and 9B).

Referring to FIGS. 9A, 9B and 12, the vehicle tailgate system 10 also includes an additional step feature 29 about half-way up the movable tailgate portion 12. This step feature 29 may also be referred to as a supplemental or an intermediate step feature. This step feature 29 provides an ergonomic advantage to some users who prefer a midway step to assist in stepping into the truck bed 16. This step feature 29 includes of a fixed portion 235, and a supplementary rotary portion 233 that extends the depth of the step, for better ingress and egress accessibility. The step feature 29 can be rotated back into its respective position, prior to rotating the movable tailgate portion 12 to the closed position. When the movable tailgate portion 12 is rotated back into its closed position, actuators are triggered to lock the movable tailgate portion 12 securely to the frame of the tailgate 14.

In one embodiment, dampers or springs may be used with the step feature 29 to control its movement between its stored position and its deployed position. In one embodiment, the step 29 includes one or more textured portions that are configured to enhance a user's grip when stepping upon and using the step 29. The step 29 may include a lock that is configured to lock/secure the step 29 when it is in its stored position or it is in its deployed positions.

The vehicle tailgate system 10 is configured to achieve the flip-style access feature. This flip-style access feature of the vehicle tailgate system 10 is possible by the movement of the movable tailgate portion 12 between a first position (FIGS. 1, 2 and 5) and a second position (FIGS. 3, 4 and 6) when the tailgate 14 is in its raised, closed position. The second position includes a position in which the movable tailgate portion 12 is rotated 180 degrees to create the access opening 21 (FIGS. 3, 4 and 6) in the tailgate 14.

As shown in FIGS. 3, 4 and 6, in one embodiment, the vehicle tailgate system 10 is configured to allow for easier accessibility to the truck bed 16 without completely opening the tailgate 14. The access opening 21 in the configuration of FIGS. 3, 4 and 6 may also assist with the fifth wheel hitch connection. That is, the vehicle tailgate system 10 is configured to assist with the fifth wheel hitch connection. The fifth wheel hitch and the gooseneck hitch are two types of hitches that are generally attached into the truck bed 16 of the truck 18 so that they are positioned to be forward of the rear wheel/axle of the truck 18. When using these types of hitches, the user of the prior art tailgates generally has to lower the tailgate of their pickup truck to its lowered, horizontal position to allow a tow trailer to reach and connect to the vehicle via these hitches (or any other type of hitch connection located inside the pick-up truck bed).

With the vehicle tailgate system 10 of the present patent application, the user, when using these types of hitches, can simply lower the movable tailgate portion 12 to its vertical, open/access position (as shown in FIGS. 3, 4 and 6) to allow the tow trailer to reach and connect to the vehicle 18 via these hitches without interference from the tailgate 14. Rotating the movable tailgate portion 12 by 180 degrees creates the access opening 21 (as shown in FIGS. 3, 4 and 6) in the tailgate 14. The access opening 21 in the tailgate 14 allows the fifth wheel hitch connection to be inserted therethrough (usually as the vehicle 18 is backed-up) for connection with the fifth wheel hitch mounted on the truck bed 16 of the vehicle 18. That is, using the vehicle tailgate system 10, the user will be able to connect the tow trailer to the vehicle 18 via these hitches without lowering the tailgate 14 to its lowered, horizontal position.

A movement of the movable tailgate portion 12, with respect to the tailgate 14 and from its horizontal, closed position (FIGS. 7A and 7B) to its released/drop-down position (FIGS. 9A and 9B), is restricted for avoiding any contact of the movable tailgate portion 12 with a trailer hitch/ball (not shown). That is, in one embodiment, the vehicle tailgate system 10 is configured to prevent its tailgate step/its movable tailgate portion 12 from hitting the regular trailer hitch. The trailer hitch may also be referred to as trailer tow hitch and has a (e.g., removable) trailer/tow ball.

In one embodiment, the vehicle tailgate system 10 may include a restrictor that is configured to restrict the (pivotal) movement of the movable tailgate portion 12 to an angle less than 90 degrees. The angle is measured from its horizontal, closed position (FIGS. 7A and 7B). In one embodiment, the vehicle tailgate system 10 is configured to restrict the movement of the movable tailgate portion 12 to 45 degrees. In this configuration, the step 24 is configured to pivot more than 90 degrees from its stored position to its deployed/used position. For example, the step 24 is configured to pivot 135 degrees from its stored position to its deployed/used position when the movement of the movable tailgate portion 12, from its horizontal, closed position (FIGS. 7A and 7B) to its released/drop-down position (FIGS. 9A and 9B), is restricted to 45 degrees.

One skilled in the art would readily appreciate that any restrictor mechanism may be used to restrict the movement of the movable tailgate portion 12. The restrictor may interchangeably be referred to as a stop. The angles provided here are exemplary, it is contemplated that the movement of the movable tailgate portion 12 is restricted to other angles as long as the movable tailgate portion 12 is not making any contact with the trailer hitch ball. In one embodiment, the vehicle tailgate system 10 includes one restrictor on one side of the movable tailgate portion 12. In another embodiment, the vehicle tailgate system 10 includes two restrictors, one on each side of the movable tailgate portion 12.

In one embodiment, the restrictor is configured to be moved between an inoperative position and an operative position. When the restrictor is in its operative position, it is configured to restrict the (pivotal) movement of the movable tailgate portion 12 with respect to the tailgate to the angle less than 90 degrees, as described above, so as to avoid any contact of the movable tailgate portion 12 with the trailer tow hitch/tow ball when the tailgate 14 is also in the open position. When the restrictor is in its inoperative position, it is configured not to restrict the movement of the movable tailgate portion 12 or to allow the movement of the movable tailgate portion 12 (i.e., to its released/drop-down position (FIGS. 9A and 9B)). That is, in the inoperative position, the stop is configured to allow the movable tailgate portion 12 to pivot downwardly from the tailgate 14 in the closed position thereof to the downwardly extending open position. This later configuration may be used when the vehicle 18 has no trailer hitch/ball installed thereon such that the movable tailgate portion 12 moves 90 degrees from its horizontal, closed position (FIGS. 7A and 7B) to its released/drop-down position (FIGS. 9A and 9B).

In one embodiment, when the restrictor mechanism is used, the slack in the structural support members 123 may be removed by using an automatic locking retracting mechanism (e.g., positioned at the fixed ends 125 of the structural support members 123). In one embodiment, the restrictor is optional. In such embodiments, the hinges and the support assembly may be configured to restrict the movement of the movable tailgate portion 12 to a desired angle.

The present patent application is configured to allow for accessibility to the truck bed without opening the tailgate 14; allow closer and more ergonomic accessibility to the truck bed when the tailgate is open; and assist with reverse operation and fifth wheel connection.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form. The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A tailgate system for a vehicle comprising:
a tailgate pivotally mounted to a vehicle body for movement about a generally horizontal pivot axis between an open position in which the tailgate extends generally horizontally along a vehicle bed to allow access to a vehicle bed area and a closed position in which the tailgate extends generally vertically to close access to the vehicle bed area;
the tailgate having a movable tailgate portion movably connected to the tailgate and configured to cover an access opening in the tailgate, the access opening configured to provide access to the vehicle bed area when the tailgate is in the closed position and the movable tailgate portion is pivoted to a downwardly extending open position; and
a support system selectively operable between a connected state connected to both the tailgate and the movable tailgate portion and a disconnected state;
the support system in the connected state being configured to support the movable tailgate portion in a step position pivoted downwardly from the tailgate in the open position thereof to provide a step, and
the support system in the disconnected state being configured to allow the movable tailgate portion to pivot downwardly from the tailgate in the closed position thereof to the downwardly extending open position,
wherein the angle of pivotal movement of the movable tailgate portion relative to the tailgate is greater in the downwardly extending open position than in the step position.

2. The tailgate system of claim 1, wherein the support system includes at least one support member that is disposed on a side of the movable tailgate portion, and
wherein, in the connected state of the support system, a portion of the at least one support member is configured to be connected to the movable tailgate portion to support the movable tailgate portion in the step position pivoted downwardly from the tailgate in the open position thereof to provide the step.

3. The tailgate system of claim 2, wherein the at least one support member includes two support members that are disposed on opposing sides of the movable tailgate portion.

4. The tailgate system of claim 2, wherein the at least one support member is a cable.

5. The tailgate system of claim 2, wherein the at least one support member has a first end portion and an opposing second end portion,
wherein the first end portion of the at least one support member is fixedly connected to the tailgate and the second end portion of the at least one support member is removably connectable to the tailgate or the movable tailgate portion, and
wherein the second end portion of the at least one support member includes a lock member.

6. The tailgate system of claim 5, wherein, in the connected state of the support system, the second end portion of the at least one support member is configured to be removably connected to the movable tailgate portion to support the movable tailgate portion in the step position pivoted downwardly from the tailgate in the open position thereof to provide the step, and
wherein, in the disconnected state of the support system, the second end portion of the at least one support member is configured to be removably connected to the tailgate to allow the movable tailgate portion to pivot downwardly from the tailgate in the closed position thereof to the downwardly extending open position.

7. The tailgate system of claim 6, further comprising a stop configured to restrict the pivotal movement of the movable tailgate portion with respect to the tailgate to an angle less than 90 degrees, and
wherein the stop is configured to move between:
an operative position in which the stop is configured to restrict the pivotal movement of the movable tailgate portion with respect to the tailgate to the angle less than 90 degrees so as to avoid any contact of the movable tailgate portion with a trailer tow hitch/tow ball when the tailgate is also in the open position; and
an inoperative position in which the stop is configured to allow the movable tailgate portion to pivot downwardly from the tailgate in the closed position thereof to the downwardly extending open position.

8. The tailgate system of claim 7, further comprising a support and lock assembly that includes the support system including the at least one support member, at least one dock carriage fixedly mounted to the tailgate, a tailgate actuator mounted in the tailgate, at least one support carriage fixedly mounted to the movable tailgate portion, and a movable tailgate portion actuator mounted in the movable tailgate portion.

9. The tailgate system of claim 8, wherein the at least one dock carriage includes a latch mechanism, wherein the latch mechanism of the at least one dock carriage includes a latch member that is configured to be movable between a lock position in which the latch member engages with and locks the lock member in the at least one dock carriage and an unlock position permitting the lock member to be released from the at least one dock carriage, wherein the latch mechanism of the at least one dock carriage also includes a lock pawl that engages with the latch member to maintain the latch member in its lock position and also allows the latch member to be moved between its lock and unlock positions.

10. The tailgate system of claim 9, wherein the at least one dock carriage includes a recess for the lock member,
wherein the recess of the at least one dock carriage allows the lock member to travel therein until the lock member engages with the latch member, and
wherein, when the lock member is disengaged from the latch member of the at least one dock carriage, the lock member travels along the recess to be released from the at least one dock carriage.

11. The tailgate system of claim 10, wherein the tailgate actuator is configured to cause the latch mechanism of the at least one dock carriage to unlock the lock member and release the lock member and the second end portion of the at least one support member connected thereto from the tailgate when the movable tailgate portion is being moved to its step position so that the movable tailgate portion, when in the step position, is supported by the at least one support member with the second end portion of the at least one support member connected to the movable tailgate portion and the first end portion of the at least one support member fixedly connected to the tailgate.

12. The tailgate system of claim 11, wherein the tailgate actuator is also configured to cause the latch mechanism of the at least one dock carriage to engage with and lock the lock member and the second end portion of the at least one support member connected thereto with the tailgate when the movable tailgate portion is moved to the downwardly extending open position.

13. The tailgate system of claim 12, wherein the at least one support carriage includes a latch mechanism,
   wherein the latch mechanism of the at least one support carriage includes a latch member that is configured to be movable between a lock position in which the latch member engages with and locks the lock member in the at least one support carriage and an unlock position permitting the lock member to be released from the at least one support carriage,
   wherein the latch mechanism of the at least one support carriage also includes a lock pawl that engages with the latch member to maintain the latch member in its lock position and also allows the latch member to be moved between its lock and unlock positions.

14. The tailgate system of claim 13, wherein the at least one support carriage includes a recess for the lock member,
   wherein the recess of the at least one support carriage allows the lock member to travel therein until the lock member engages with the latch member, and
   wherein, when the lock member is disengaged from the latch member of the at least one support carriage, the lock member travels along the recess to be released from the at least one support carriage.

15. The tailgate system of claim 14, wherein the movable tailgate portion actuator is configured to cause the latch mechanism of the support carriage to engage with and lock the lock member and the second end portion of the support member connected thereto to the movable tailgate portion when the movable tailgate portion is being moved to its step position so that the movable tailgate portion, when in the step position, is supported by the at least one support member with the second end portion of the at least one support member connected to the movable tailgate portion and the first end portion of the at least one support member fixedly connected to the tailgate.

16. The tailgate system of claim 15, wherein the movable tailgate portion actuator is also configured to cause the latch mechanism of the support carriage to release the lock member and the second end portion of the at least one support member connected thereto from the movable tailgate portion when the movable tailgate portion is being moved to the downwardly extending open position.

17. The tailgate system of claim 16, wherein operations of the movable tailgate portion actuator and the tailgate actuator are synchronized so that, when the movable tailgate portion is being moved to the downwardly extending open position, the movable tailgate portion actuator causes the latch mechanism of the at least one support carriage to release the lock member and the second end portion of the at least one support member connected thereto from the movable tailgate portion at the same time as the tailgate actuator causes the latch mechanism of the at least one dock carriage to engage with and lock the lock member and the second end portion of the at least one support member connected thereto with the tailgate.

18. The tailgate system of claim 17, wherein, when the movable tailgate portion is being moved to its step position, the tailgate actuator causes the latch mechanism of the at least one dock carriage to unlock the lock member and release the lock member and the second end portion of the at least one support member connected thereto from the tailgate at the same time as the movable tailgate portion actuator causes the latch mechanism of the at least one support carriage to engage with and lock the lock member and the second end portion of the at least one support member connected thereto to the movable tailgate portion.

19. The tailgate system of claim 18, wherein the support and lock assembly includes a lock actuator operatively associated with a lock mechanism that is configured to lock and unlock the movable tailgate portion to/from the tailgate, and
   wherein, when the movable tailgate portion is moved to the downwardly extending open position, the lock actuator is actuated to lock the movable tailgate portion securely to the tailgate.

20. A tailgate system for a vehicle comprising:
   a tailgate pivotally mounted to a vehicle body for movement about a generally horizontal pivot axis between an open position in which the tailgate extends generally horizontally along a vehicle bed to allow access to a vehicle bed area and a closed position in which the tailgate extends generally vertically to close access to the vehicle bed area;
   the tailgate having an access opening configured to provide access to the vehicle bed area when the tailgate is in the closed position, and the tailgate having a movable tailgate portion movably connected to the tailgate;
   wherein, when the tailgate is in the closed position, the movable tailgate portion is configured to cover the access opening in the tailgate,
   wherein, when the tailgate is in the open position, the movable tailgate portion is configured to be moved to a step position to provide a step, and
   wherein the tailgate includes a movable panel configured to provide a supplemental step between the aforementioned step and the truck bed when the movable tailgate portion is in the step position.

21. The tailgate system of claim 20, wherein the movable tailgate portion includes a first portion and a second portion,
   wherein the second portion is configured to move pivotably and outwardly away from the first portion, when the movable tailgate portion is in the step position, to provide the step, the step being presented to the user for assistance to access to the truck bed when the tailgate is in the open position and the movable tailgate portion is pivoted to the step position.

22. The tailgate system of claim 21, wherein the movable panel is pivotably connected to an inner surface of the first portion, and
   wherein the movable panel is configured to move pivotably and outwardly away from the inner surface of the first portion, when the movable tailgate portion is in the step position, to provide the supplemental step, the supplemental step being presented to the user for assistance to access to the truck bed when the tailgate is in the open position and the movable tailgate portion is pivoted to the step position.

23. The tailgate system of claim 20, wherein the movable panel is separate from the movable tailgate portion.

\* \* \* \* \*